US012811382B2

(12) United States Patent
Senoo et al.

(10) Patent No.: US 12,811,382 B2
(45) Date of Patent: Nov. 24, 2026

(54) ELECTRICAL CONNECTION UNIT

(71) Applicant: YAZAKI CORPORATION, Tokyo (JP)

(72) Inventors: Ryu Senoo, Kakegawa (JP); Hirotaka Mukasa, Kakegawa (JP); Hirokuni Kurashiki, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 95 days.

(21) Appl. No.: 19/190,595

(22) Filed: Apr. 26, 2025

(65) Prior Publication Data

US 2025/0372984 A1 Dec. 4, 2025

(30) Foreign Application Priority Data

May 29, 2024 (JP) ................................ 2024-087326

(51) Int. Cl.
*B60R 16/023* (2006.01)
*H02G 3/16* (2006.01)

(52) U.S. Cl.
CPC ........... *H02G 3/16* (2013.01); *B60R 16/0239* (2013.01)

(58) Field of Classification Search
CPC .................................................. B60R 16/0239
See application file for complete search history.

(56) References Cited

U.S. PATENT DOCUMENTS

2015/0359112 A1* 12/2015 Nakashima ............ H05K 7/026 174/560
2016/0345455 A1* 11/2016 Maebashi ........... B60R 16/0238
2023/0253771 A1* 8/2023 Shiraki .................... H02G 3/16 174/520
2025/0368151 A1* 12/2025 Senoo ................. B60R 16/0238

FOREIGN PATENT DOCUMENTS

JP 2024-37492 A 3/2024

* cited by examiner

*Primary Examiner* — Hung V Ngo
(74) *Attorney, Agent, or Firm* — KENEALY VAIDYA LLP

(57) ABSTRACT

An electrical connection unit includes a first electronic component, a base member, and a first bus bar. The base member has an insulating property and includes a flat surface portion, and the flat surface portion includes an accommodation portion that is recessed in a first direction or penetrates the flat surface portion in the first direction in a case where a thickness direction of the flat surface portion is the first direction. The first bus bar is at least partially accommodated in the accommodation portion and extends along the flat surface portion, and the flat surface portion electrically connected to the first electronic component has an opening that penetrates the flat surface portion in the first direction and is disposed along at least one of a part of an outer shape of the bus bar and a part of an outer shape of the first electronic component.

5 Claims, 14 Drawing Sheets

ELECTRICAL CONNECTION UNIT

BACKGROUND OF THE INVENTION

Field of the Invention

Embodiments of the present invention relate to an electrical connection unit.

Priority is claimed on Japanese Patent Application No. 2024-087326 filed in Japan on May 29, 2024, the content of which is incorporated herein by reference.

Description of the Related Art

An electrical connection unit having a housing that accommodates electronic components and a bus bar attached to the housing in a standing posture is known.

PRIOR ART DOCUMENT

Patent Document

[Patent Document 1] Japanese Unexamined Patent Application, First Publication No. 2024-037492

SUMMARY OF THE INVENTION

Incidentally, a height of an electrical connection unit is expected to be further reduced.

An embodiment provides an electrical connection unit capable of achieving height reduction.

An electrical connection unit according to an embodiment includes a first electronic component, a base member, and a first bus bar. The first electronic component includes a first terminal. The base member has an insulating property and includes a flat surface portion having a plate shape or a sheet shape, and the flat surface portion includes an accommodation portion that is recessed in a first direction or penetrates the flat surface portion in the first direction in a case where a thickness direction of the flat surface portion is the first direction. The first bus bar is at least partially accommodated in the accommodation portion and extends along the flat surface portion, and the flat surface portion electrically connected to the first electronic component has an opening that penetrates the flat surface portion in the first direction and that is disposed along at least one of a part of an outer shape of the bus bar and a part of an outer shape of the first electronic component.

According to one embodiment, a height of an electrical connection unit can be reduced.

DETAILED DESCRIPTION OF THE INVENTION

Figure 1:
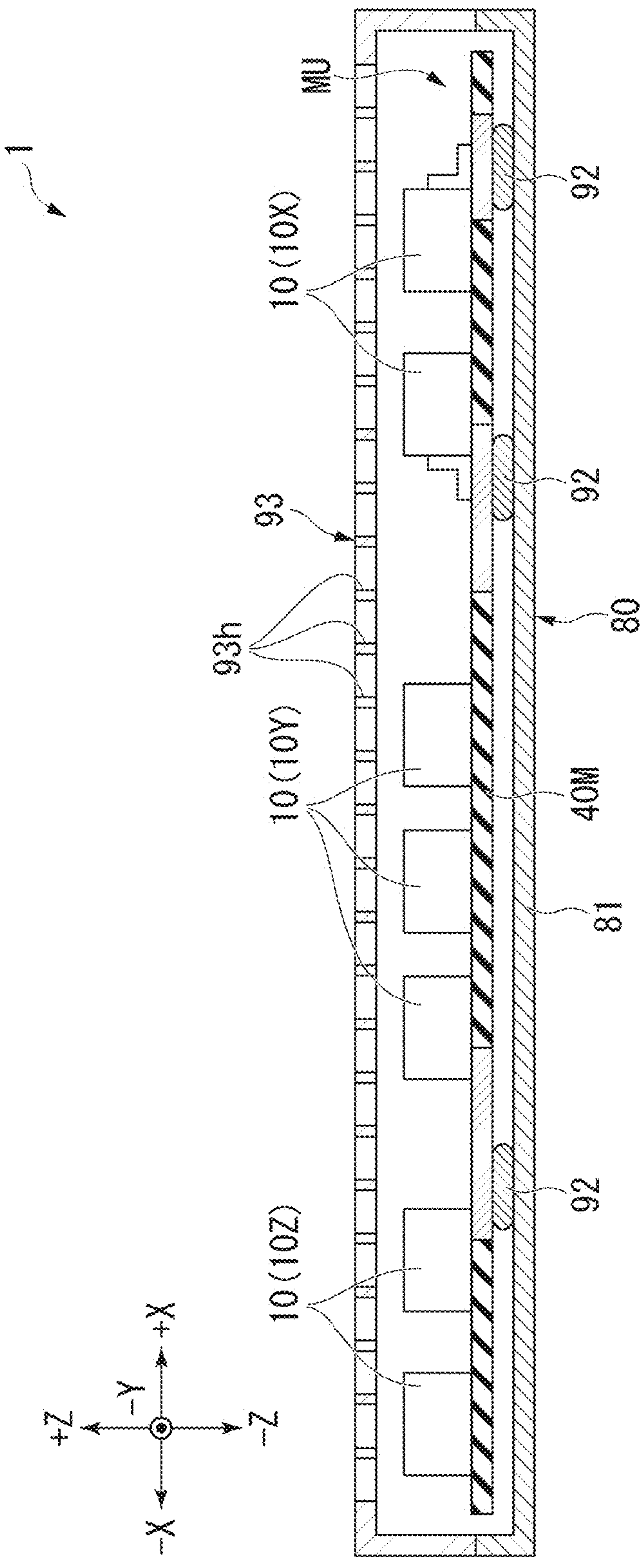
FIG. 1 is a cross-sectional view illustrating an electrical connection unit according to an embodiment.

Hereinafter, embodiments will be described with reference to the drawings. In the following description, constitutions having the same or similar functions are denoted by the same reference numbers. Redundant descriptions of these constitutions may be omitted. Note that the constitution described below does not limit the scope of the embodiment.

In the present disclosure, the terms are defined as follows. The term "connection" is not limited to a mechanical connection, and may include an electrical connection. That is, the term "connection" is not limited to a case where two elements that are connection targets are directly connected, and may include a case where two elements that are connection targets are connected with another element interposed therebetween. The term "accommodation" is not limited to a case where the entire component is accommodated, and may include a case where only a part of the component is accommodated (a state in which the remaining part of the component protrudes). The term "facing" indicates that virtual projection images of two target objects overlap each other when viewed from a specific direction. That is, the term "facing" is not limited to a case where two target objects directly face each other, and may include a case where two target objects face each other in a state in which another member exists between the two target objects. "Parallel", "orthogonal", or "the same" may include "substantially parallel", "substantially orthogonal", or "substantially the same", respectively.

In the present disclosure, a +X direction, a −X direction, a +Y direction, a −Y direction, a +Z direction, and a −Z direction are defined as follows. The +X direction is a direction from a first end 80*e*1 to a second end 80*e*2 of a metal plate 80 that will be described later (see FIG. 11). The −X direction is a direction opposite to the +X direction. Hereinafter, in a case where the +X direction and the −X direction are not distinguished, the directions will be simply referred to as "X direction". The +Y direction and the −Y direction are directions intersecting (for example, orthogonal to) the X direction. The +Y direction is a direction from a third end 80*e*3 to a fourth end 80*e*4 of the metal plate 80 that will be described later (see FIG. 11). The −Y direction is a direction opposite to the +Y direction. Hereinafter, in a case where the +Y direction and the −Y direction are not distinguished, the directions will be simply referred to as "Y direction". The +Z direction and the −Z direction are directions intersecting (for example, orthogonal to) the X direction and the Y direction. The +Z direction is a direction from the metal plate 80 that will be described later toward a main body MU (see FIG. 1). The −Z direction is a direction opposite to the +Z direction. Hereinafter, in a case where the +Z direction and the −Z direction are not distinguished, the directions will be simply referred to as "Z direction". The Z direction is an example of a "first direction". The X direction is an example of a "second direction". The Y direction is an example of a "third direction". The "second direction" is not limited to the X direction, and may be the Y direction or other directions. The "third direction" is not limited to the Y direction, and is a direction intersecting the "first direction" and the "second direction".

Hereinafter, in a case where the X direction and the Y direction are not distinguished, the directions may be referred to as "horizontal direction". Hereinafter, the Z direction may be referred to as "vertical direction". Hereinafter, the +Z direction side may be referred to as "upper", and the −Z direction side may be referred to as "lower". However, these expressions are expressions for convenience of description, and do not limit a gravity direction of an electrical connection unit 1 (an installation posture of the electrical connection unit 1).

First Embodiment

<1. Constitution of Electrical Connection Unit>

FIG. 1 is a cross-sectional view illustrating an electrical connection unit 1 of a first embodiment. The electrical connection unit 1 is, for example, an in-vehicle device mounted on a vehicle such as an electric vehicle (EV), a hybrid electric vehicle (HEV), or a plug-in hybrid electric vehicle (PHEV). The electrical connection unit 1 may be referred to as an "electrical connection box" or a "junction box", for example. However, the electrical connection unit 1 is not limited to a box-shaped device.

The electrical connection unit 1 includes, for example, a main body MU, a metal plate 80, an insulating sheet 91 (see FIG. 11), a plurality of heat transfer members 92, and an insulating cover 93.

<2. Main Body>

First, the main body MU will be described.

Figure 2:
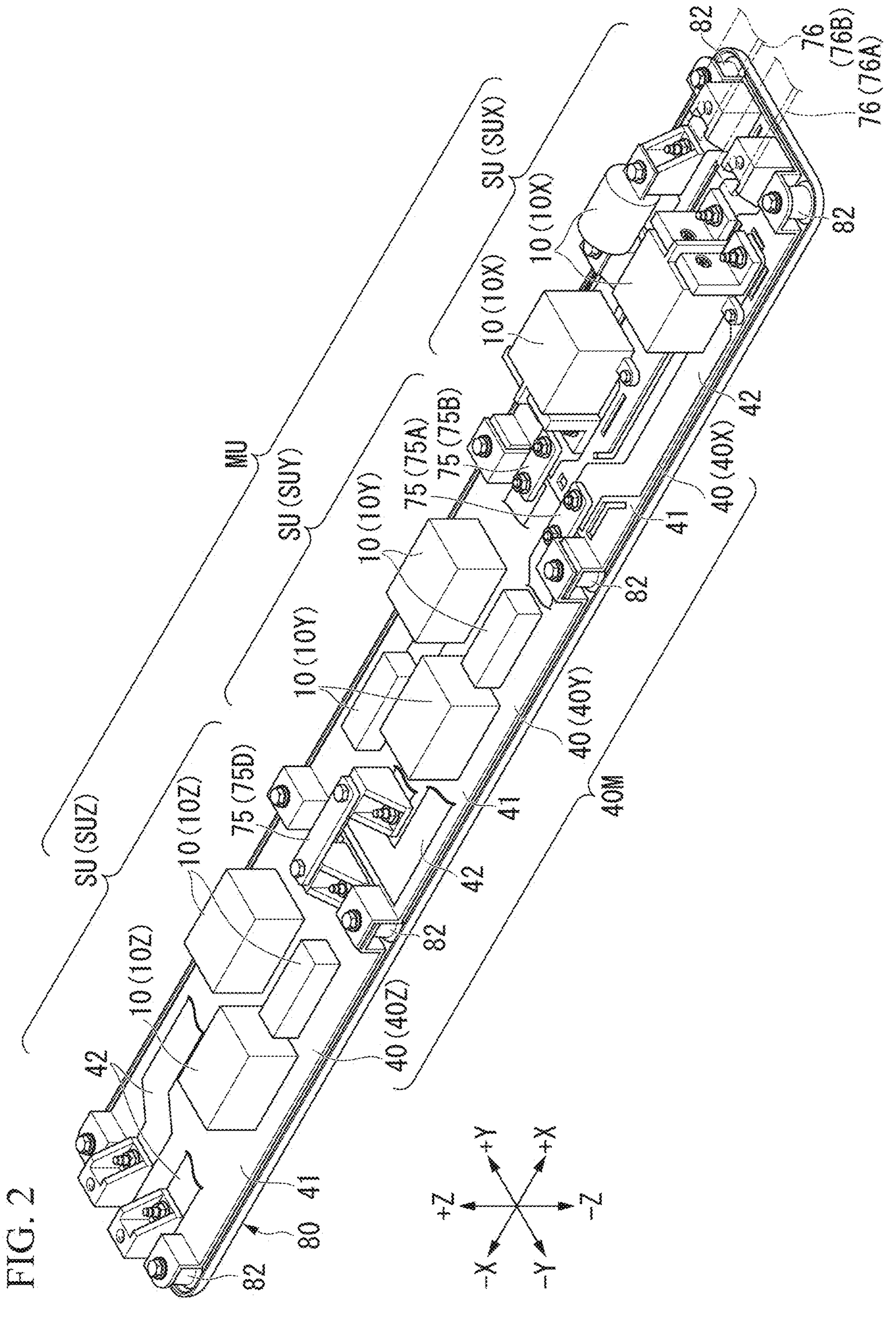
FIG. 2 is a perspective view for describing a main body of the embodiment.

FIG. 2 is a perspective view showing the main body MU. The main body MU is a portion that performs a main function (for example, switching of electrical connection states or overcurrent protection) of the electrical connection unit 1. In the present embodiment, the main body MU is divided into a plurality of subunits SU. The main body MU is formed by connecting a plurality of subunits SU. In the present embodiment, the main body MU includes three subunits SU (subunits SUX, SUY, and SUZ). Each subunit SU may be referred to as a "circuit constitution body".

The subunit SUX has an electrical first function. The subunit SUX includes, for example, a plurality of electronic components 10X and a first routing board 40X. The plurality of electronic components 10X are electrically connected to the first routing board 40X.

The subunit SUY has an electrical second function. The second function is a function different from the first function. The subunit SUY includes, for example, a plurality of electronic components 10Y and a second routing board 40Y. The plurality of electronic components 10Y are electrically connected to the second routing board 40Y.

The subunit SUZ has an electrical third function. The third function is a function different from the first function and the second function. The subunit SUZ includes, for example, a plurality of electronic components 10Z and a third routing board 40Z. The plurality of electronic components 10Z are electrically connected to the third routing board 40Z.

In the present embodiment, the three subunits SUX, SUY, and SUZ are disposed to be arranged in the X direction. For example, the subunit SUX is disposed on the +X direction side with respect to the subunit SUY. The subunit SUX and the subunit SUY are electrically connected via a plurality of coupling bus bars 75 extending between the first routing board 40X and the second routing board 40Y. On the other hand, the subunit SUZ is disposed on the −X direction side with respect to the subunit SUY. The subunit SUZ and the subunit SUY are electrically connected via a plurality of coupling bus bars 75 (only one is illustrated in FIG. 2) extending between the third routing board 40Z and the second routing board 40Y. The coupling bus bar 75 is disposed on the side opposite to the metal plate 80 with respect to the plurality of subunits SU.

In the present embodiment, the three routing boards 40X, 40Y, and 40Z included in the three subunits SUX, SUY, and SUZ are disposed on the same plane. In other words, the three routing boards 40X, 40Y, and 40Z are disposed at the same height position in the Z direction. As a result, one large routing board 40M is formed by the three routing boards 40X, 40Y, and 40Z.

In the present embodiment, the three subunits SUX, SUY, and SUZ have the same or similar basic structure. Therefore, one subunit SU will be described in detail below as a representative. Hereinafter, in a case where the subunit SUX, the subunit SUY, and the subunit SUZ are not distinguished, the subunits are simply referred to as "subunit SU". In addition, in a case where the electronic component 10X, the electronic component 10Y, and the electronic component 10Z are not distinguished, the electronic components are simply referred to as "electronic component 10". In a case where the first routing board 40X, the second routing board 40Y, and the third routing board 40Z are not distinguished, the routing boards are simply referred to as "routing board 40". One subunit SU included in the three subunits SUX, SUY, and SUZ is an example of a "first subunit". On the other hand, another subunit SU included in the three subunits SUX, SUY, and SUZ is an example of a "second subunit".

Note that the main body MU need not be divided into a plurality of subunits SU instead of the example described above. That is, the main body MU may be formed by the plurality of electronic components 10 and one routing board 40. In addition, the two or more subunits SU are not limited to the subunits SU having different functions, and may be the subunits SU having the same function.

<3. Constitution of Subunit>

Next, a constitution of the subunit SU will be described.

Figure 3:
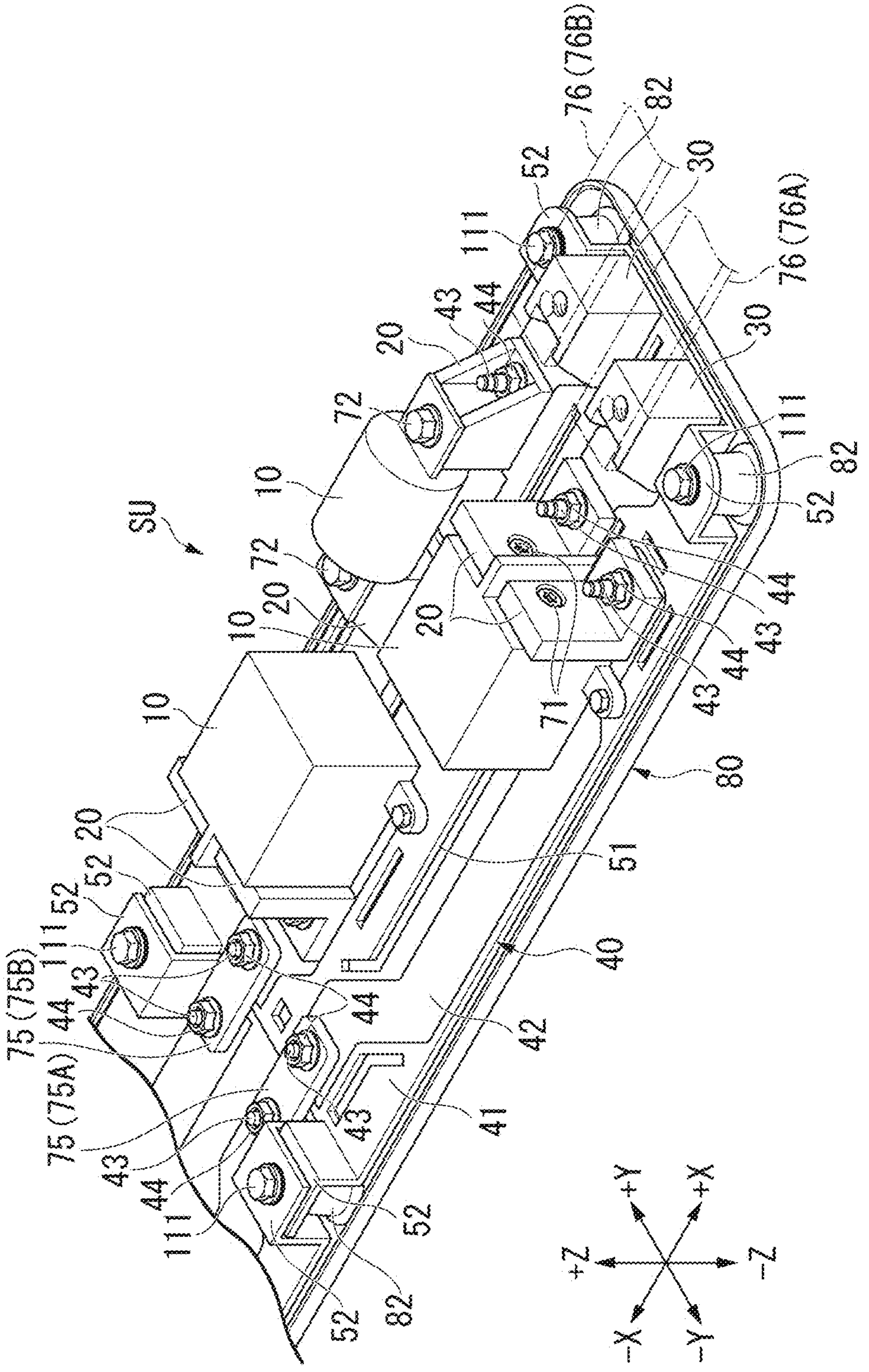
FIG. 3 is a perspective view for describing a subunit of the embodiment.
Figure 4:
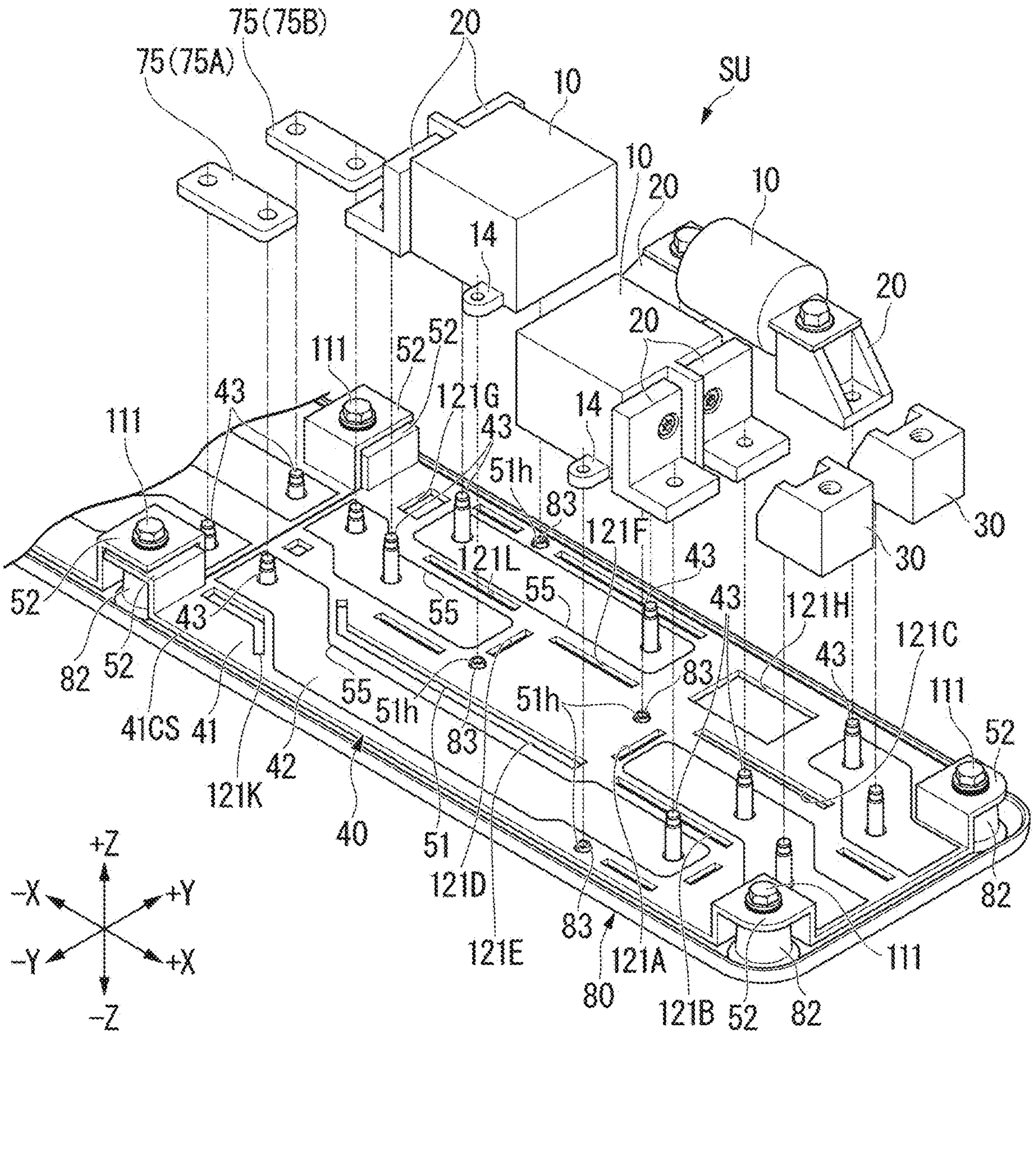
FIG. 4 is a partially exploded perspective view of the subunit of the embodiment.

FIG. 3 is a perspective view showing the subunit SU. FIG. 4 is a partially exploded perspective view of the subunit SU. The subunit SU includes, for example, a plurality of electronic components 10, a plurality of connection components 20 for component connection, a plurality of connection components 30 for external connection, and a routing board 40. The connection components 20 and 30 are members forming an energization path in the vertical direction. The connection components 20 and 30 may be referred to as "vertical routing members".

<3.1 Electronic Component and Connection Component for Component Connection>

First, the electronic component 10 and the connection component 20 for component connection will be described.

The electronic component 10 is an electronic component mounted according to a function required for the subunit SU. The electronic component 10 is, for example, a connector, a fuse, a relay (for example, a mechanical relay or a semiconductor relay), a capacitor, a branch component, any of various sensors (for example, a current sensor or a voltage sensor), an electronic control unit, or an electronic component unit in which two or more of these are unitized. Note that the type of the electronic component 10 is not limited to the above example. The electronic component 10 is, for example, a heat generating component that generates heat at the time of energization. Hereinafter, a first-type electronic component 10M and a second-type electronic component 10N will be described as examples of the electronic component 10.

The connection component 20 is a component that electrically connects the electronic component 10 to the routing board 40. The connection component 20 forms a part of an energization path in the subunit SU. The connection component 20 is made of a metal (for example, copper or a copper alloy). The connection component 20 may be referred to as a "metal component". Hereinafter, a first-type connection component 20M and a second-type connection component 20N will be described as examples of the connection component 20.

<3.1.1 First-Type Electronic Component>

Figure 5:
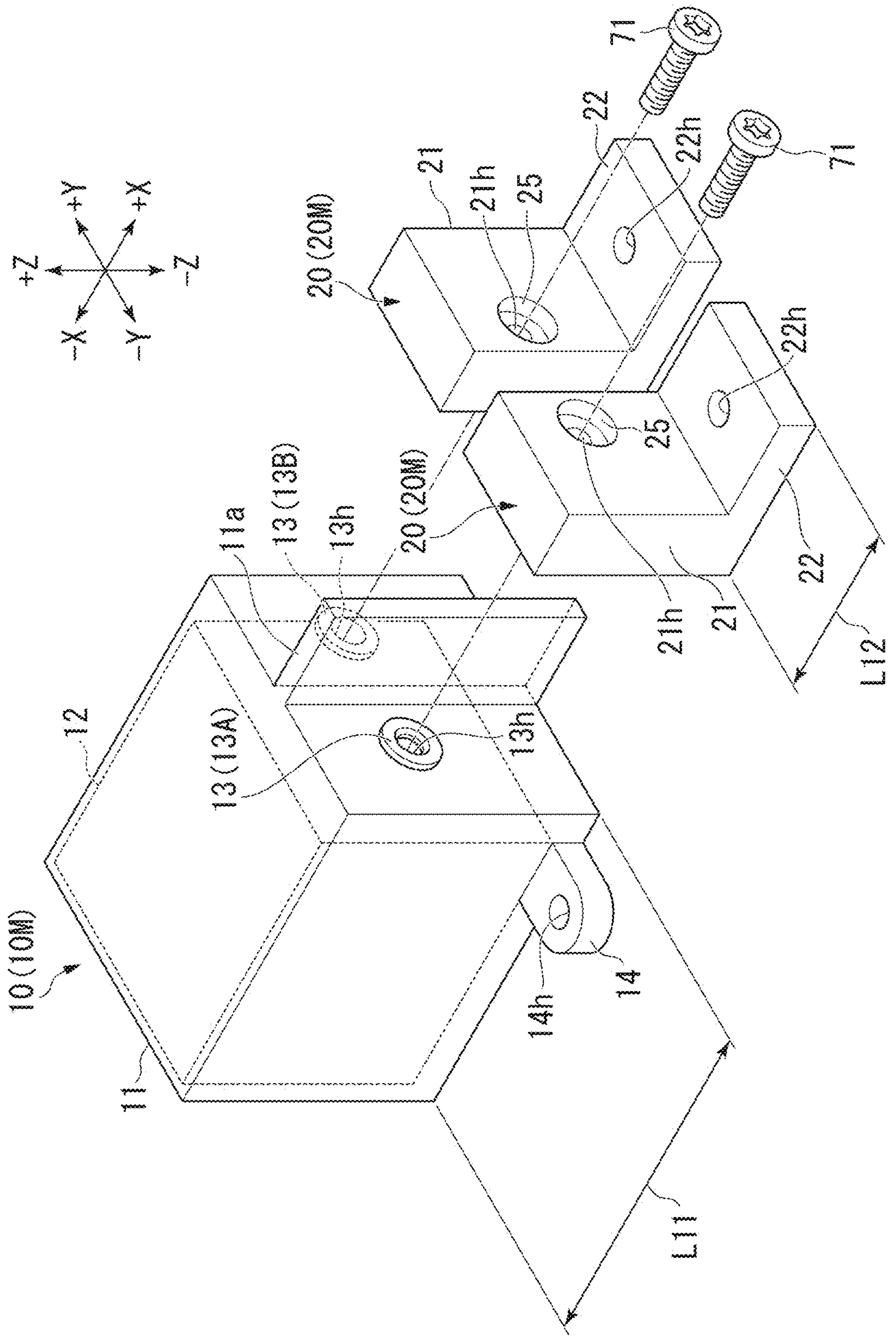
FIG. 5 is a perspective view for describing an electronic component and a connection component according to the embodiment.

FIG. 5 is a perspective view illustrating the first-type electronic component 10M and the first-type connection component 20M. The first-type electronic component 10M is an electronic component in which a plurality of terminals 13 are disposed to be arranged at one end of the electronic component 10M. The electronic component 10M includes, for example, a case 11, a component body 12, a plurality of terminals 13, and a plurality of attachment portions 14.

(Case)

The case 11 is an outer member that forms most of the outer shape of the electronic component 10M. The case 11 is made of, for example, synthetic resin and has an insulating property. The case 11 accommodates the component body 12. The case 11 and the component body 12 may be integrally formed.

In the present embodiment, the case 11 has an insulating rib 11*a* that protrudes in the horizontal direction (for example, the X direction) and extends in the Z direction. The insulating rib 11*a* has, for example, a plate shape formed in the horizontal direction (for example, the X direction) and the Z direction. The insulating rib 11*a* extends over the entire length of the case 11 in the Z direction, for example. The insulating rib 11*a* is disposed between the plurality of terminals 13 (a terminal 13A and a terminal 13B that will be described later). The insulating rib 11*a* electrically insulates the terminal 13A from the terminal 13B. In the present embodiment, a part of the insulating rib 11*a* is disposed between first portions 21 (that will be described later) of two connection components 20M connected to the electronic component 10M. The insulating rib 11*a* electrically insulates the first portions 21 of the two connection components 20M connected to the electronic component 10M from each other.

(Component Body)

The component body 12 is a portion that performs a main function of the electronic component 10M. For example, in a case where the electronic component 10M is a relay, the component body 12 includes a switch (for example, a contact) that switches between a conductive state and a non-conductive state. For example, in a case where the electronic component 10M is a fuse, the component body 12 includes a fusion portion that is fused when an overcurrent flows. For example, in a case where the electronic component 10M is a capacitor, the component body 12 includes a portion that stores electric charge.

(Terminal)

The terminal 13 is an electrical connection portion exposed to the outside of the case 11. The terminal 13 is electrically connected to the component body 12 inside the case 11. In the present embodiment, the electronic component 10M includes a terminal 13A and a terminal 13B as the plurality of terminals 13. One of the terminal 13A and the terminal 13B is a terminal on the positive electrode side. The other of the terminal 13A and the terminal 13B is a terminal on the negative electrode side. One of the terminal 13A and the terminal 13B is an example of a "first terminal". The other of the terminal 13A and the terminal 13B is an example of a "second terminal".

In the present embodiment, the terminal 13A and the terminal 13B are provided at one end of the electronic component 10M in the horizontal direction (for example, the X direction). The terminal 13A and the terminal 13B are disposed to be arranged in the horizontal direction (for example, the Y direction). Each terminal 13 has an attachment hole 13*h* to which a fastening member 71 (for example, a screw or a bolt) that will be described later is attached. The attachment hole 13*h* is open in the horizontal direction (for example, the X direction). An inner circumferential surface of the attachment hole 13*h* of the electronic component 10M has a screw groove.

(Attachment Portion)

The attachment portion 14 is a portion for fixing the electronic component 10M. The attachment portion 14 has an attachment hole 14*h* to which a fastening member 112 (for example, a screw or a bolt; and see FIG. 11) that will be described later is attached. The attachment hole 14*h* is open in the Z direction. The attachment hole 14*h* is an insertion hole through which the fastening member 112 passes. A fixing destination of the attachment portion 14 will be described later.

<3.1.2 First-Type Connection Component>

The first-type connection component 20M is a component that electrically connects the first-type electronic component 10M to the routing board 40. In the present embodiment, the connection component 20M electrically connects the electronic component 10M to a bus bar 42 (see FIG. 8) included in the routing board 40. In the present embodiment, a width L12 of the connection component 20M in a longitudinal direction (for example, the X direction) of the electronic component 10M is smaller than a width L11 of the electronic component 10M in the longitudinal direction. The connection component 20M includes, for example, a first portion 21 and a second portion 22.

(First Portion)

The first portion 21 of the connection component 20M is a portion connected to the terminal 13 of the electronic component 10M. The first portion 21 is a plate-shaped or rectangular parallelepiped portion extending in the Z direction. The first portion 21 extends in the Z direction along one end (for example, an end in the X direction) of the electronic component 10M. The first portion 21 is a standing portion that stands in the Z direction with respect to the routing board 40 (for example, with respect to a bus bar 42 that will be described later). The first portion 21 is adjacent to the electronic component 10M in the horizontal direction (for example, the X direction). For example, the first portion 21 is adjacent to the terminal 13 of the electronic component 10M in the horizontal direction (for example, the X direction), and is connected to the terminal 13 of the electronic component 10M from the horizontal direction (for example, the X direction).

The first portion 21 of the connection component 20M has a first attachment hole 21*h* through which the fastening member 71 (for example, a screw or a bolt) passes. The first attachment hole 21*h* is open in the horizontal direction (for example, the X direction). The first portion 21 has a recess 25 around the first attachment hole 21*h*. The recess 25 is an accommodation portion that accommodates a head of the fastening member 71 inserted into the first attachment hole 21*h*. The fastening member 71 that has passed through the first attachment hole 21*h* is engaged with the attachment hole 13*h* of the terminal 13 of the electronic component 10M, and thus first portion 21 is physically and electrically connected to the terminal 13 of the electronic component 10M. The first portion 21 need not have the recess 25.

(Second Portion)

Figure 8:
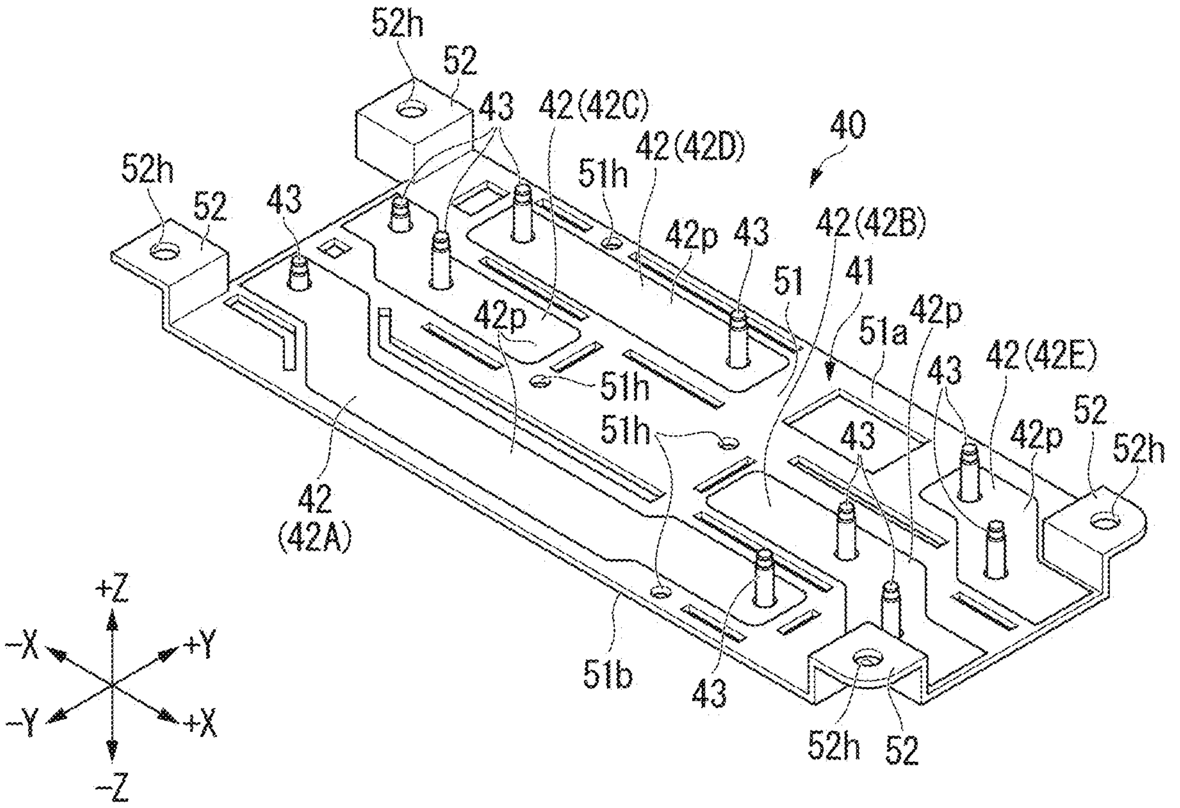
FIG. 8 is a perspective view illustrating a routing board of the embodiment.

The second portion 22 of the connection component 20M is a portion connected to the bus bar 42 (see FIG. 8). The second portion 22 protrudes in the horizontal direction (for example, the X direction) from end of the first portion 21 on the −Z direction side. The second portion 22 is a plate portion provided in the horizontal direction. The second portion 22 is adjacent to the bus bar 42 in the Z direction, and is connected to the bus bar 42 from the Z direction. The second portion 22 of the connection component 20M is attached to the fastening member 43 (for example, a screw or a bolt; and see FIG. 8) protruding from the bus bar 42 in the +Z direction from the Z direction, and is physically and electrically connected to the bus bar 42. In the present embodiment, the second portion 22 of the connection component 20M has a second attachment hole 22*h* through which the fastening member 43 passes. The second attachment hole 22*h* is open in the Z direction. In the second portion 22, the fastening member 43 passes through the second attachment hole 22*h*. An engagement member 44 (for example, a nut; and see FIG. 3) is engaged with the tip of the fastening member 43 that has passed through the second attachment hole 22*h*, and thus the second portion 22 is fixed to the bus bar 42. In the present embodiment, the first portion 21 and the second portion 22 form one L-shaped connection component 20M.

<3.1.3 Second-Type Electronic Component>

Figure 6:
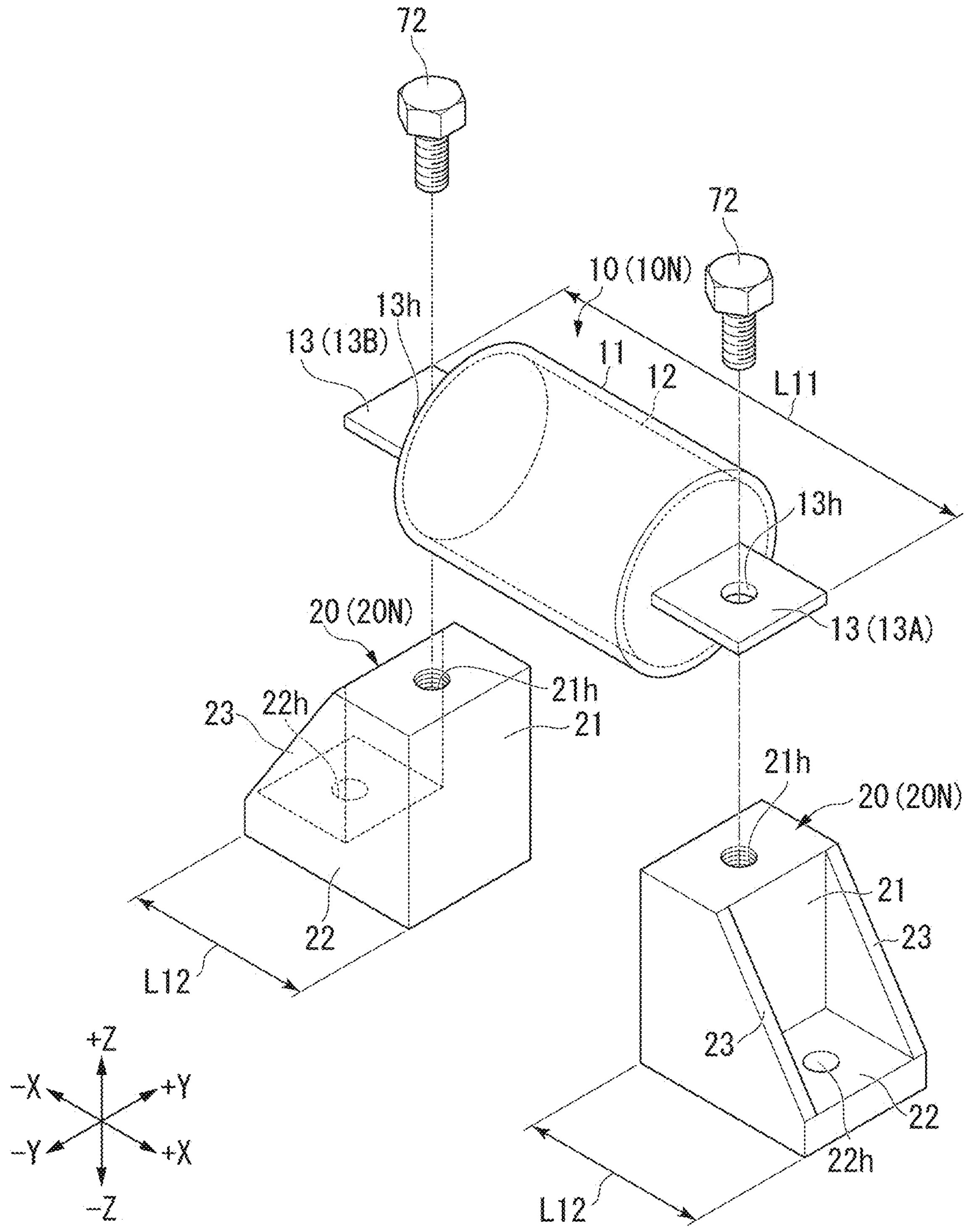
FIG. 6 is a perspective view for describing the electronic component and the connection component according to the embodiment.

FIG. 6 is a perspective view illustrating the second-type electronic component 10N and the second-type connection component 20N. The second-type electronic component 10N is an electronic component in which two terminals 13 are separately disposed at both ends in the horizontal direction of the electronic component 10N. The electronic component 10N includes, for example, a case 11, a component body 12, and a plurality of terminals 13. Note that, among the constitutions of the electronic component 10N, constitutions having functions similar to those of the electronic component 10M are denoted by the same reference numbers. In this case, in the description regarding the electronic component 10N, the "electronic component 10M" may be replaced with the "electronic component 10N" in the description regarding the electronic component 10M described above.

In the electronic component 10N, the terminal 13A and the terminal 13B are disposed separately at both ends of the electronic component 10N in the horizontal direction (for example, the X direction). Each terminal 13 has an attachment hole 13*h* to which a fastening member 72 (for example, a screw or a bolt) that will be described later is attached. The attachment hole 13*h* is open in the Z direction. For example, the attachment hole 13*h* of the electronic component 10N is an insertion hole through which the fastening member 72 passes. One of the terminal 13A and the terminal 13B is an example of a "first terminal". The other of the terminal 13A and the terminal 13B is an example of a "second terminal".

<3.1.4 Second-Type Connection Component>

The second-type connection component 20N is a component that electrically connects the second-type electronic component 10N to the routing board 40. In the present embodiment, the connection component 20N electrically connects the electronic component 10N to the bus bar 42 (see FIG. 8) included in the routing board 40. In the present embodiment, a width L12 of the connection component 20N in the longitudinal direction (for example, the X direction) of the electronic component 10N is smaller than a width L11 of the electronic component 10N in the longitudinal direction. The connection component 20N includes, for example, a first portion 21, a second portion 22, and a third portion 23.

(First Portion)

The first portion 21 of the connection component 20N is a portion connected to the terminal 13 of the electronic component 10N. The first portion 21 is a rectangular parallelepiped portion extending in the Z direction. The first portion 21 is a standing portion that stands in the Z direction with respect to the routing board 40 (for example, with respect to the bus bar 42). The first portion 21 is adjacent to the terminal 13 of the electronic component 10N in the Z direction, and is connected to the terminal 13 of the electronic component 10N from the Z direction. The first portion 21 of the connection component 20N has a first attachment hole 21*h* with which the fastening member 72 is engaged. The first attachment hole 21*h* is open in the Z direction. An inner circumferential surface of the first attachment hole 21*h* of the connection component 20N has a screw groove. The fastening member 72 that has passed through the attachment hole 13*h* of the terminal 13 of the electronic component 10N is engaged with the attachment hole 21*h* of the first portion 21, and thus the first portion 21 is physically and electrically connected to the terminal 13 of the electronic component 10N.

(Second Portion)

The second portion 22 of the connection component 20N is a portion connected to the bus bar 42 (see FIG. 8). The second portion 22 protrudes in the horizontal direction (for example, the X direction) from end of the first portion 21 on the −Z direction side. The second portion 22 is a plate portion provided in the horizontal direction. The second portion 22 is adjacent to the bus bar 42 in the Z direction, and is connected to the bus bar 42 from the Z direction. The second portion 22 of the connection component 20N is attached to, from the Z direction, the fastening member 43 (for example, a screw or a bolt; and see FIG. 8) protruding from the bus bar 42 in the +Z direction, and is physically and electrically connected to the bus bar 42. In the present embodiment, the second portion 22 of the connection component 20N has a second attachment hole 22*h* through which the fastening member 43 passes. The second attachment hole 22*h* is open in the Z direction. In the second portion 22, the fastening member 43 that will be described later passes through the second attachment hole 22*h*. An engagement member 44 (for example, a nut; and see FIG. 3) is engaged with the tip of the fastening member 43 that has passed through the second attachment hole 22*h*, and thus the second portion 22 is fixed to the bus bar 42.

(Third Portion)

The third portion 23 is a standing wall (side wall) standing in the +Z direction from both ends of the second portion 22 in the horizontal direction. The third portion 23 is a wall provided in the Z direction. The third portion 23 is connected to the first portion 21 and is also connected to the second portion 22. For example, the third portion 23 extends obliquely so as to increase in the X direction as it advances in the −Z direction. The third portion 23 may be provided in the connection component 20M described above. On the other hand, the connection component 20N need not have the third portion 23.

<3.2 Connection Component for External Connection>

Next, the connection component 30 for external connection will be described.

Figure 7:
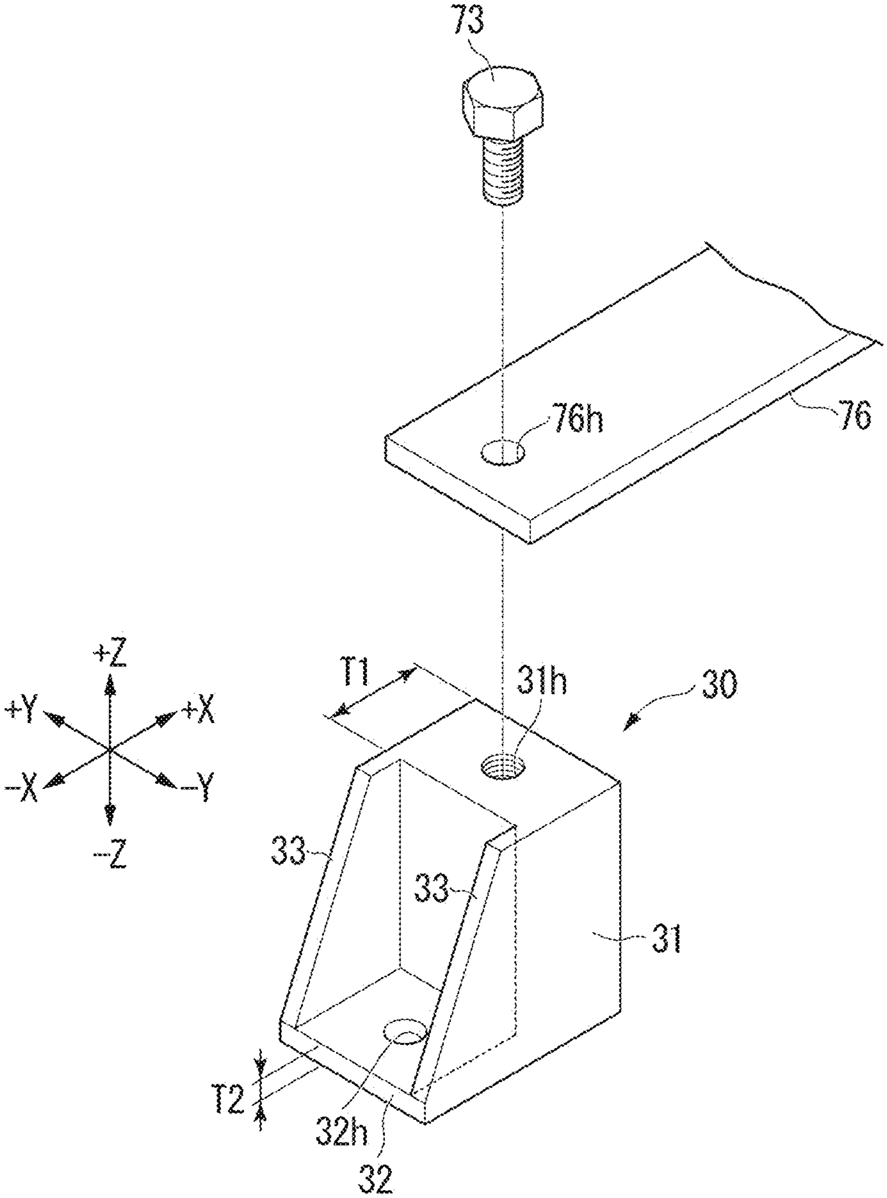
FIG. 7 is a perspective view illustrating the connection component according to the embodiment.

FIG. 7 is a perspective view illustrating the connection component 30 for external connection. The connection component 30 is a component that electrically connects an external coupling bus bar 76 to the routing board 40. In the present embodiment, the connection component 30 electrically connects the external coupling bus bar 76 to the bus bar 42 (see FIG. 8) included in the routing board 40. The external coupling bus bar 76 is electrically connected to an external device. In the present disclosure, the "external device" is an electrical device existing outside the electrical connection unit 1. The external device is, for example, a battery unit mounted on a vehicle or an inverter for driving a motor of the vehicle, but is not limited to these examples. The connection component 30 includes, for example, a first portion 31, a second portion 32, and a third portion 33.

(First Portion)

The first portion 31 is a portion connected to the external coupling bus bar 76. The first portion 31 is a rectangular parallelepiped portion extending in the Z direction. The first portion 31 is a standing portion that stands in the Z direction with respect to the routing board 40 (for example, with respect to the bus bar 42). The first portion 31 is adjacent to the external coupling bus bar 76 in the Z direction, and is connected to the external coupling bus bar 76 from the Z direction. The first portion 31 has a first attachment hole 31*h* through which a fastening member 73 (for example, a screw or a bolt) passes. The first attachment hole 31*h* is open in the Z direction. An inner circumferential surface of the first attachment hole 31*h* has a screw groove. The fastening member 73 that has passed through the attachment hole 76*h* of the external coupling bus bar 76 is engaged with the attachment hole 31*h* of the first portion 31, and thus the first portion 31 is physically and electrically connected to the external coupling bus bar 76.

(Second Portion)

The second portion 32 is a portion connected to the bus bar 42 (see FIG. 8). The second portion 32 protrudes in the horizontal direction (for example, the X direction) from the end of the first portion 31 on the −Z direction side. The second portion 32 is a plate portion provided in the horizontal direction. The second portion 32 is adjacent to the bus bar 42 in the Z direction, and is connected to the bus bar 42 from the Z direction. The second portion 32 is attached to, from the Z direction, the fastening member 43 (for example, a screw or a bolt; and see FIG. 8) protruding from the bus bar 42 in the +Z direction, and is physically and electrically connected to the bus bar 42. In the present embodiment, the second portion 32 has a second attachment hole 32*h* through which the fastening member 43 passes. The second attachment hole 32*h* is open in the Z direction. In the second portion 32, the fastening member 43 that will be described later passes through the second attachment hole 32*h*. The engagement member 44 (for example, a nut; and see FIG. 3) is engaged with the tip of the fastening member 43 that has passed through the second attachment hole 32*h*, and thus the second portion 32 is fixed to the bus bar 42.

(Third Portion)

The third portion 33 is a standing wall (side wall) standing in the +Z direction from each of both ends of the second portion 32 in the horizontal direction. The third portion 33 is a wall provided in the Z direction. The third portion 33 is connected to the first portion 31 and is also connected to the second portion 32. For example, the third portion 33 extends obliquely to increase in the X direction (or the Y direction) as proceeding in the −Z direction. The connection component 30 need not include the third portion 33.

<3.3 Routing Board>

Next, the routing board 40 will be described.

FIG. 8 is a perspective view illustrating the routing board 40. The routing board 40 is a member that forms at least a part of an energization path between the plurality of electronic components 10 and/or at least a part of an energization path between the electronic component 10 and an external device. In the present disclosure, the "routing board" indicates a board-type routing structure. The "board type" indicates a plate shape along one plane when viewed as a whole regardless of a fine shape. In the present disclosure, the term "plate shape", "sheet shape", or "planar" is not limited to the case of being completely flat, and may include a case where a fixing structure, a rib, or the like protruding in the Z direction is partially present, a case where an uneven shape following the thickness of the bus bar is present on the surface, and the like. In the present embodiment, the routing board 40 has a plate shape formed in the X direction and the Y direction.

The routing board 40 includes, for example, a base plate 41, one or more (for example, a plurality of) bus bars 42, and a plurality of fastening members 43. In the present embodiment, the base plate 41 and the plurality of bus bars 42 are integrated through insert molding. For example, the routing board 40 is formed as a single member by insert-molding the bus bar 42 with the base plate 41 after the fastening member 43 is fixed to the bus bar 42. That is, the bus bar 42 is integrated with the base plate 41 without using a fastening member such as a screw or a bolt. Note that the routing board 40 may be formed by another structure instead of the insert molding. A modification example in which the routing board 40 is formed by another structure will be described later.

Figure 9:
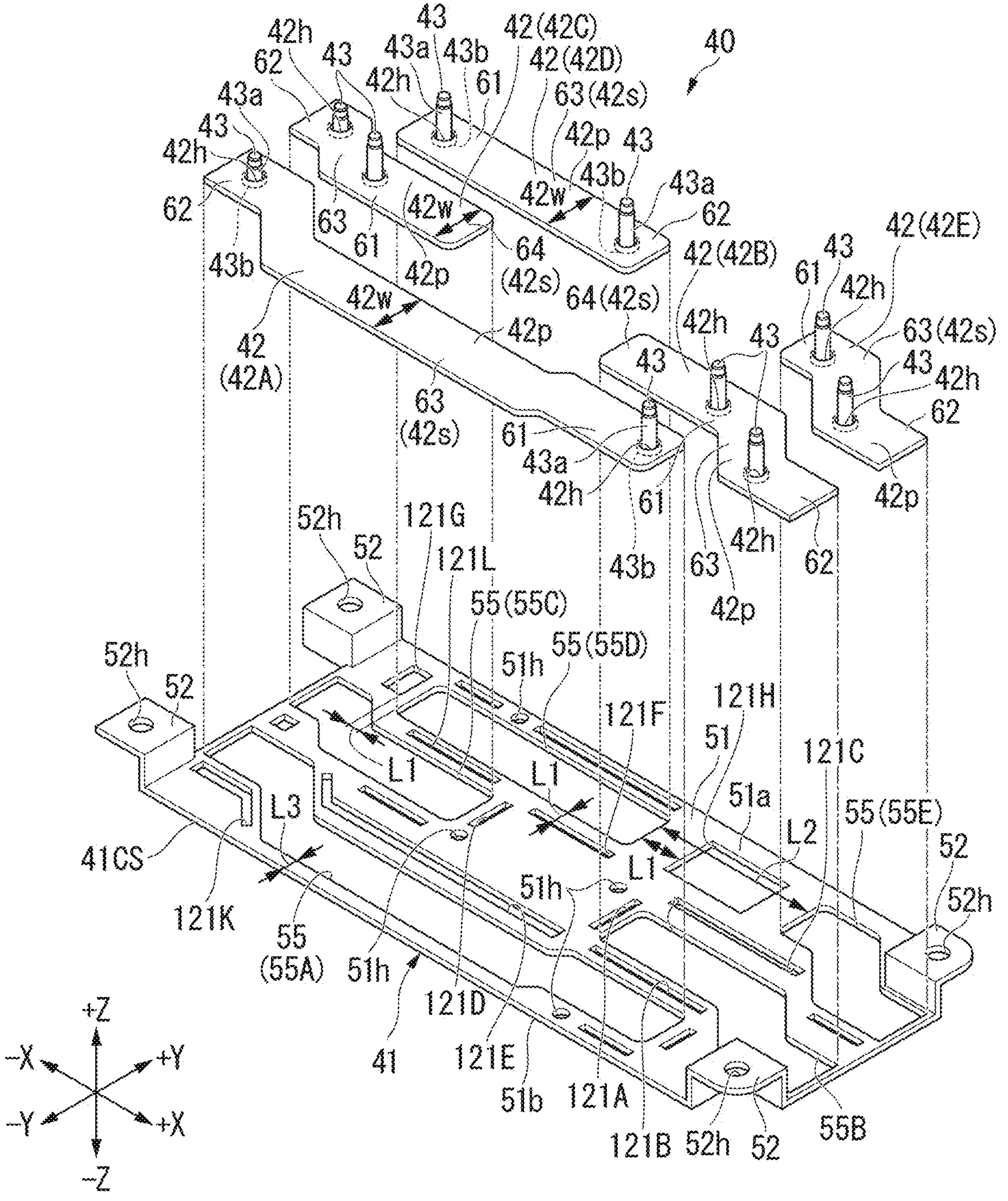
FIG. 9 is a partially exploded perspective view of the routing board according to the embodiment.

FIG. 9 is a partially exploded perspective view of the routing board 40. Hereinafter, for convenience of description, the base plate 41, the bus bar 42, and the fastening member 43 will be described with reference to the drawings in which the routing board 40 is partially exploded.

(Base Plate)

The base plate 41 is a holding member that integrally holds the plurality of bus bars 42 arranged in the horizontal direction at intervals. The base plate 41 is made of, for example, synthetic resin and has an insulating property. The base plate 41 electrically insulates the plurality of bus bars 42 from each other. The base plate 41 is an example of a "base member". The base plate 41 may be referred to as an "insulating substrate". The base plate 41 includes, for example, a flat surface portion 51 and a plurality of fixing portions 52. The fixing portion 52 will be described later.

The flat surface portion 51 is a portion formed in a plate shape in the base plate 41. The flat surface portion 51 has a plate shape formed in the horizontal direction. The flat surface portion 51 forms a main portion of the base plate 41. The flat surface portion 51 forms a base portion (insulating base portion) of the base plate 41. In the present embodiment, the flat surface portion 51 extends over the entire width in the X direction of the base plate 41 and over the entire width in the Y direction of the base plate 41 except for four corner portions of the base plate 41.

The flat surface portion 51 has a first surface 51*a* and a second surface 51*b*. The first surface 51*a* is a surface directed in the +Z direction. The first surface 51*a* is a flat surface provided in the horizontal direction. The first surface 51*a* faces the plurality of electronic components 10 and faces the insulating cover 93 (see FIG. 1) of the electrical connection unit 1. The second surface 51*b* is located on the side opposite to the first surface 51*a*. The second surface 51*b* is a surface directed in the −Z direction. The second surface 51*b* is a flat surface provided in the horizontal direction. The second surface 51*b* faces the metal plate 80 (see FIG. 1). A thickness direction (plate thickness direction) of the flat surface portion 51 is the Z direction.

The flat surface portion 51 has, for example, one or more (for example, a plurality of) accommodation portions 55 in which the bus bars 42 are accommodated, respectively. The plurality of accommodation portions 55 are formed apart from each other in the X direction or the Y direction. Each of the accommodation portions 55 is, for example, a through-hole penetrating the flat surface portion 51 in the Z direction. Note that the accommodation portion 55 may be a recess provided on the first surface 51*a* or the second surface 51*b* of the flat surface portion 51 and recessed in the Z direction, instead of a through-hole. In the present disclosure, the phrase "the accommodation portion penetrates the flat surface portion in the first direction (Z direction)" may include a case where a part of the entire length of the accommodation portion 55 penetrates the flat surface portion 51 in the Z direction (for example, the remaining portion of the accommodation portion 55 may be a recess recessed in the Z direction, or may be provided inside the base plate 41 and not exposed to the outside of the base plate 41). Similarly, in the present disclosure, the phrase "the accommodation portion is recessed in the first direction (Z direction)" may include a case where a part of the entire length of the accommodation portion 55 is recessed in the Z direction (for example, a remaining portion of the accommodation portion 55 may be a through-hole penetrating the flat surface portion 51 in the Z direction, or may be provided inside the base plate 41 and not exposed to the outside of the base plate 41).

In addition, the flat surface portion 51 has one or more (for example, a plurality of) openings 121. The opening 121 is provided along at least one of a part of the bus bar 42 or a part of the outer shape of the electronic component 10. As illustrated in FIG. 9, the opening 121 disposed along a part of the bus bar 42 is also an opening disposed along a part of the accommodation portion 55. The opening 121 will be described in detail later.

Each accommodation portion 55 has an outer shape corresponding to the shape of the bus bar 42 to be accommodated when viewed from the Z direction. In the present embodiment, the flat surface portion 51 includes, for example, five accommodation portions 55A, 55B, 55C, 55D, and 55E as the plurality of accommodation portions 55. The accommodation portion 55A is provided to correspond to a bus bar 42A that will be described later, and accommodates the bus bar 42A. The accommodation portion 55B is provided to correspond to a bus bar 42B that will be described later, and accommodates the bus bar 42B. The accommodation portion 55C is provided to correspond to a bus bar 42C that will be described later, and accommodates the bus bar 42C. The accommodation portion 55D is provided to correspond to a bus bar 42D that will be described later, and accommodates the bus bar 42D. The accommodation portion 55E is provided to correspond to a bus bar 42E that will be described later, and accommodates the bus bar 42E.

(Bus Bar)

The bus bar 42 is a routing member (electrical connection member) included in the routing board 40. The bus bar 42 is, for example, a routing member for electrically connecting the plurality of electronic components 10. Alternatively, the bus bar 42 may be a routing member for connecting the electronic component 10 to an external device. The bus bar 42 is made of a metal (for example, copper or a copper alloy) and has conductivity. In the present embodiment, the routing board 40 includes, for example, five bus bars 42A, 42B, 42C, 42D, and 42E as the plurality of bus bars 42. The five bus bars 42A, 42B, 42C, 42D, and 42E are disposed to be arranged in the horizontal direction at intervals. The five bus bars 42A, 42B, 42C, 42D, and 42E include portions arranged on the same plane. The five bus bars 42A, 42B, 42C, 42D, and 42E are held by the flat surface portion 51 of the base plate 41.

At least a part of each bus bar 42 has a plate shape formed in the horizontal direction. At least a part of each bus bar 42 is accommodated in the accommodation portion 55 and extends along the flat surface portion 51. That is, at least a part of each bus bar 42 extends along the first surface 51*a* of the flat surface portion 51. At least a part of each bus bar 42 extends in the horizontal direction in the accommodation portion 55. In the present embodiment, each bus bar 42 has a plate shape formed in the horizontal direction over the entire bus bar 42. Each of the bus bars 42 is accommodated in the accommodation portion 55 over the entire length of the bus bar 42 and extends along the flat surface portion 51. Hereinafter, a portion of each bus bar 42 that is accommodated in the accommodation portion 55 and extends along the flat surface portion 51 may be referred to as a "plate portion 42*p*". The bus bar 42 is a member that forms a horizontal energization path. The bus bar 42 may be referred to as a "horizontal routing member".

Figure 10:
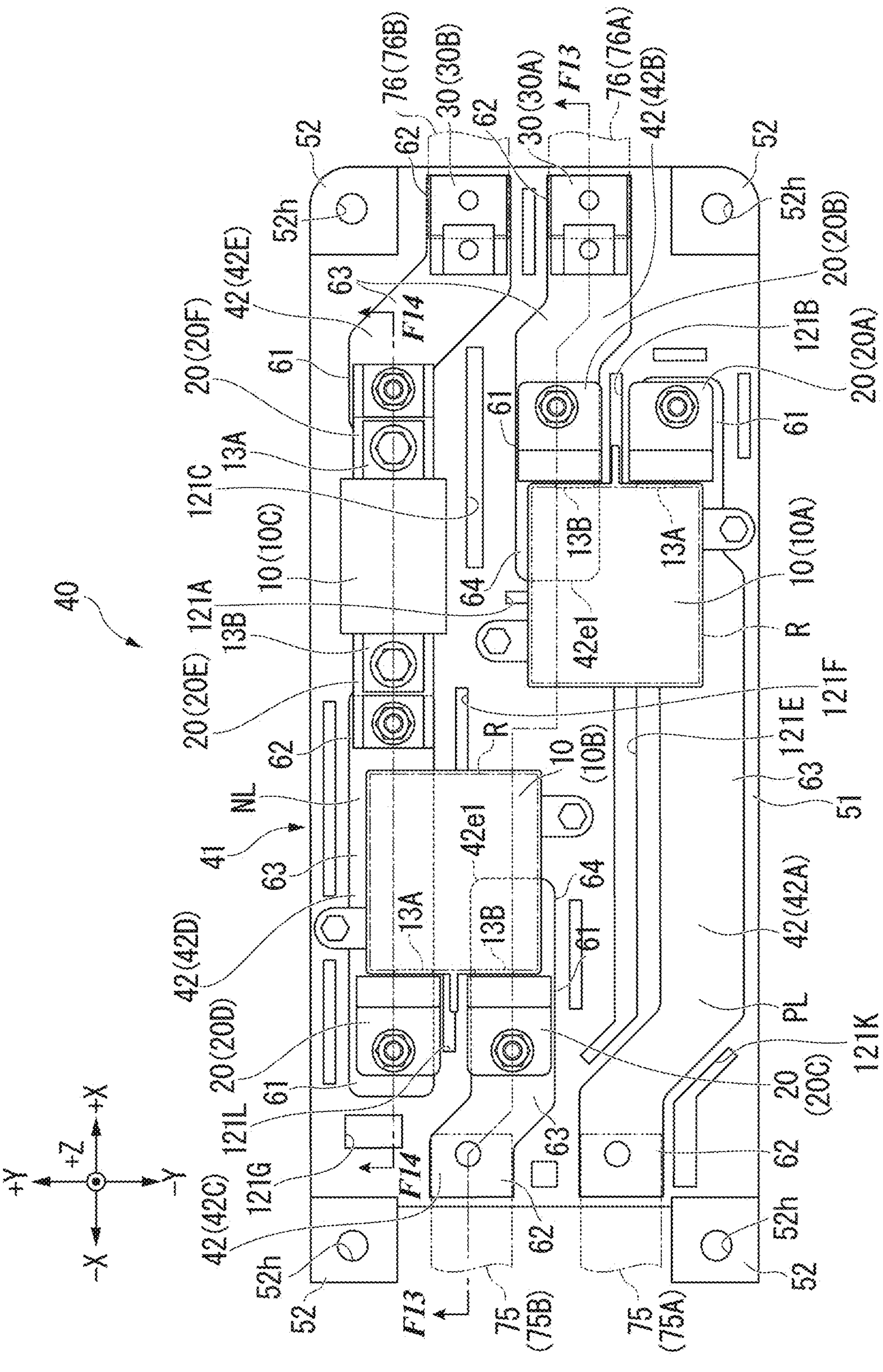
FIG. 10 is a plan view illustrating the routing board according to the embodiment.

FIG. 10 is a plan view illustrating the routing board 40. The plate portion 42*p* of each bus bar 42 has, for example, a first connection portion 61, a second connection portion 62, and an extending portion 63.

The first connection portion 61 is a portion in contact with one connection component 20 (hereinafter referred to as a "first connection component 20"). The first connection component 20 is a connection component that connects one electronic component 10 (hereinafter referred to as a "first electronic component 10") to the bus bar 42. The first connection portion 61 is a portion of the bus bar 42 overlapping the first connection component 20 when viewed from the Z direction. The first connection portion 61 is adjacent to the first connection component 20 in the Z direction, and is connected to the first connection component 20 from the Z direction.

The second connection portion 62 is a portion in contact with another connection component 20 (hereinafter referred to as a "second connection component 20"). The second connection component 20 is a connection component that connects another electronic component 10 (hereinafter referred to as a "second electronic component 10") included in the plurality of electronic components 10 to the bus bar 42. The second connection portion 62 is a portion of the bus bar 42 overlapping the second connection component 20 when viewed from the Z direction. The second connection portion 62 is adjacent to the second connection component 20 in the Z direction, and is connected to the second connection component 20 from the Z direction.

Note that the second connection portion 62 may be a portion in contact with another connection component 30 (hereinafter referred to as a "second connection component 30") instead of the above example. The connection component 30 is a connection component for connecting an external device to the bus bar 42. In this case, the second connection portion 62 is a portion of the bus bar 42 overlapping the second connection component 30 when viewed from the Z direction. The second connection portion 62 is adjacent to the second connection component 30 in the Z direction, and is connected to the second connection component 30 from the Z direction.

The first connection portion 61 and the second connection portion 62 are an example of a "first connection portion" and also an example of a "second connection portion".

The second connection portion 62 may be a portion in contact with the coupling bus bar 75 for connection with another subunit SU instead of the connection components 20 and 30. In this case, the second connection portion 62 is a portion of the bus bar 42 that overlaps the coupling bus bar 75 when viewed from the Z direction. The second connection portion 62 is adjacent to the coupling bus bar 75 in the Z direction, and is connected to the coupling bus bar 75 from the Z direction.

The extending portion 63 extends from the first connection portion 61 in the X direction or the Y direction. The extending portion 63 is provided between the first connection portion 61 and the second connection portion 62. The extending portion 63 extends over the first connection portion 61 and the second connection portion 62. The extending portion 63 connects the first connection portion 61 to the second connection portion 62.

In the present embodiment, the first connection portion 61, the second connection portion 62, and the extending portion 63 have a plate shape formed in the horizontal direction. In the present embodiment, each bus bar 42 is accommodated in the accommodation portion 55 at least over the first connection portion 61 and the second connection portion 62 and extends along the flat surface portion 51. For example, the first connection portion 61, the second connection portion 62, and the extending portion 63 are accommodated in the accommodation portion 55 and extend along the flat surface portion 51.

In the present embodiment, the extending portions 63 of some of the bus bars 42 are accommodated in the accommodation portion 55 to extend over both sides of a region R through the region R overlapping the electronic component 10 when viewed from the Z direction. For example, the extending portion 63 extends linearly in the X direction. The extending portion 63 extends over a region R overlapping the electronic component 10 when viewed from the Z direction, over the +X direction side and the −X direction side of the region R. That is, the bus bar 42 is accommodated in the accommodation portion 55 to be easily routed through a better path (for example, a path with a shorter distance) without being disturbed by the presence of the electronic component 10.

The one or more bus bars 42 may have an extension 64 in addition to the first connection portion 61, the second connection portion 62, and the extending portion 63. The extension 64 is a portion where the bus bar 42 extends for the purpose of increasing a heat dissipation area and/or increasing a heat capacity for heat storage (heat absorption). The extension 64 is a portion that is not used for electrical connection. For example, the extension 64 is located on the side opposite to the extending portion 63 with respect to the first connection portion 61 (or the second connection portion 62). The extension 64 has a plate shape formed in the horizontal direction. The extension 64 is accommodated in the accommodation portion 55 and extends along the flat surface portion 51. The extension 64 extends to the region R overlapping the electronic component 10 when viewed from the Z direction, and has an end 42*e*1 of the bus bar 42 at a position overlapping the electronic component 10 when viewed from the Z direction.

In the present embodiment, at least one of the extending portion 63 or the extension 64 includes, for example, a straight portion 42*s* linearly extending in the second direction (X direction). A distance L1 between the opening 121 and the bus bar 42 that will be described later is expressed by a width 42*w* of the straight portion 42*s* in the third direction (Y direction). In a case where the straight portion 42*s* of the bus bar 42 extends in the Y direction, the distance L1 between the opening 121 that will be described later and the bus bar 42 is expressed by a width of the straight portion 42*s* in the second direction (X direction).

Some routing examples of the bus bar 42 will be described below. The plurality of electronic components 10 include three electronic components 10A, 10B, and 10C. The electronic component 10A and the electronic component 10B are, for example, the first-type electronic component 10M. The electronic component 10C is, for example, the second-type electronic component 10N. Note that the type of the electronic component 10 is not limited to the above example. The plurality of connection components 20 include six connection components 20A, 20B, 20C, 20D, 20E, and 20F. The plurality of connection components 30 include two connection components 30A and 30B. The plurality of coupling bus bars 75 include two coupling bus bars 75A and 75B. The plurality of external coupling bus bars 76 include two external coupling bus bars 76A and 76B.

(First Routing Example)

First, a routing example related to the bus bar 42A will be described. The bus bar 42A has the first connection portion 61, the second connection portion 62, and extending portion 63. The first connection portion 61 is located on the +X direction side with respect to the electronic component 10A when viewed from the Z direction. The first connection portion 61 is electrically connected to the terminal 13A of the electronic component 10A via the connection component 20A that is the first connection component 20. The second connection portion 62 is located on the −X direction side with respect to the electronic component 10A when viewed from the Z direction. The second connection portion 62 is electrically connected to another subunit SU via the coupling bus bar 75A.

The extending portion 63 is accommodated in the accommodation portion 55 to extend over both sides of the region R through the region R overlapping the electronic component 10A when viewed from the Z direction. For example, the extending portion 63 extends linearly in the X direction. The extending portion 63 extends over the region R overlapping the electronic component 10A when viewed from the Z direction, over the +X direction side and the −X direction side of the region R. The bus bar 42A is an example of a "first bus bar". The accommodation portion 55A that accommodates the bus bar 42A is an example of a "first accommodation portion". The bus bar 42A is, for example, a bus bar included in the positive electrode line PL included in the electrical connection unit 1.

(Second Routing Example)

Next, a routing example related to the bus bar 42B will be described. The bus bar 42B has the first connection portion 61, the second connection portion 62, the extending portion 63, and the extension 64. The first connection portion 61 is electrically connected to the terminal 13B of the electronic component 10A via the connection component 20B that is the first connection component 20. The second connection portion 62 is electrically connected to the external coupling bus bar 76A via the connection component 30A that is the second connection component 30. The extension 64 extends to the region R overlapping the electronic component 10A when viewed from the Z direction, and has an end 42*e*1 of the bus bar 42 at a position overlapping the electronic component 10A. Similarly to the bus bar 42A, the bus bar 42B may have an extending portion 63 that extends through the region R overlapping the electronic component 10 and over both sides of the region R when viewed from the Z direction. The bus bar 42B is another example of a "first bus bar". The accommodation portion 55B that accommodates the bus bar 42B is another example of a "first accommodation portion". From another point of view, the bus bar 42B is an example of a "second bus bar". The accommodation portion 55B is another example of a "second accommodation portion". The bus bar 42B is, for example, a bus bar included in the positive electrode line PL included in the electrical connection unit 1.

(Third Routing Example)

Next, a routing example related to the bus bar 42C will be described. The bus bar 42C includes the first connection portion 61, the second connection portion 62, the extending portion 63, and the extension 64. The first connection portion 61 is electrically connected to the terminal 13B of the electronic component 10B via the connection component 20C that is the first connection component 20. The second connection portion 62 is electrically connected to another subunit SU via the coupling bus bar 75B. The extension 64 extends to the region R overlapping the electronic component 10B when viewed from the Z direction, and has an end 42*e*1 of the bus bar 42 at a position overlapping the electronic component 10B when viewed from the Z direction. The bus bar 42C is another example of a "first bus bar". The accommodation portion 55C that accommodates the bus bar 42C is another example of a "first accommodation portion". The bus bar 42C is, for example, a bus bar included in the negative electrode line NL included in the electrical connection unit 1. From another point of view, the bus bar 42C is an example of a "third bus bar". The accommodation portion 55C is an example of a "third accommodation portion".

(Fourth Routing Example)

Next, a routing example related to the bus bar 42D will be described. The bus bar 42D has the first connection portion 61, the second connection portion 62, and the extending portion 63. The first connection portion 61 is electrically connected to the terminal 13A of the electronic component 10B via the connection component 20D that is the first connection component 20. The second connection portion 62 is electrically connected to the terminal 13B of the electronic component 10C via the connection component 20E that is the second connection component 20. The bus bar 42D is another example of a "first bus bar". The accommodation portion 55D that accommodates the bus bar 42D is another example of a "first accommodation portion". The bus bar 42D is, for example, a bus bar included in the negative electrode line NL included in the electrical connection unit 1. From another point of view, the bus bar 42D is another example of a "third bus bar". The accommodation portion 55D is another example of a "third accommodation portion".

(Fifth Routing Example)

Next, a routing example related to the bus bar 42E will be described. The bus bar 42E has the first connection portion 61, the second connection portion 62, and the extending portion 63. The first connection portion 61 is electrically connected to the terminal 13A of the electronic component 10C via the connection component 20F that is the first connection component 20. The second connection portion 62 is electrically connected to the external coupling bus bar 76B via the connection component 30B that is the second connection component 30. The bus bar 42E is another example of a "first bus bar". The accommodation portion 55E that accommodates the bus bar 42E is another example of a "first accommodation portion". The bus bar 42E is, for example, a bus bar included in the negative electrode line NL included in the electrical connection unit 1. From another point of view, the bus bar 42E is another example of a "third bus bar". The accommodation portion 55E is another example of a "third accommodation portion".

(Fastening Member)

Next, referring to FIG. 9 again, the fastening member 43 will be described. The fastening member 43 is a component for fixing the bus bar 42 to a connection target component (the connection component 20, the connection component 30, the coupling bus bar 75, or a connection component 100) of the bus bar 42. The fastening member 43 is, for example, a caulking bolt fixed to the bus bar 42. The fastening member 43 is an example of a "fastening portion".

In the present embodiment, each of the first connection portion 61 and the second connection portion 62 of the bus bar 42 has a through-hole 42*h*. The through-hole 42*h* penetrates the bus bar 42 in the Z direction. The fastening member 43 is, for example, a bolt having a shaft 43*a* and a head 43*b*. A circumferential surface of the shaft 43*a* has a screw groove. The head 43*b* has a diameter larger than that of the shaft 43*a*. The head 43*b* of the fastening member 43 is caulked and fixed to the bus bar 42 in a state in which the shaft 43*a* passes through the through-hole 42*h* of the bus bar 42. With this fixation, the fastening member 43 is electrically and physically connected to the bus bar 42 in a state in which the shaft 43*a* protrudes in the +Z direction from the through-hole 42*h* of the bus bar 42. The fastening member 43 is not limited to caulking fixation, and may be fixed to the bus bar 42 through welding or other methods.

In the present embodiment, the connection component 20 is attached to the fastening member 43 from the Z direction in a state of being previously fixed to the electronic component 10 via the fastening member 72 or the fastening member 71. For example, in the connection component 20, the shaft portion 43*a* of the fastening member 43 is inserted into the second attachment hole 22*h* of the second portion 22. The engagement member 44 (for example, a nut) is engaged with the shaft portion 43*a* of the fastening member 43 protruding from the second attachment hole 22*h* of the second portion 22 of the connection component 20. The engagement member 44 is attached to the shaft 43*a* in the Z direction, for example. This engagement fixes the second portion 22 of the connection component 20 to the fastening member 43.

<4. Metal Plate, Insulating Sheet, Heat Transfer Member, and Insulating Cover>

Next, the metal plate 80, the insulating sheet 91, the heat transfer member 92, and the insulating cover 93 will be described.

<4.1 Metal Plate>

Figure 11:
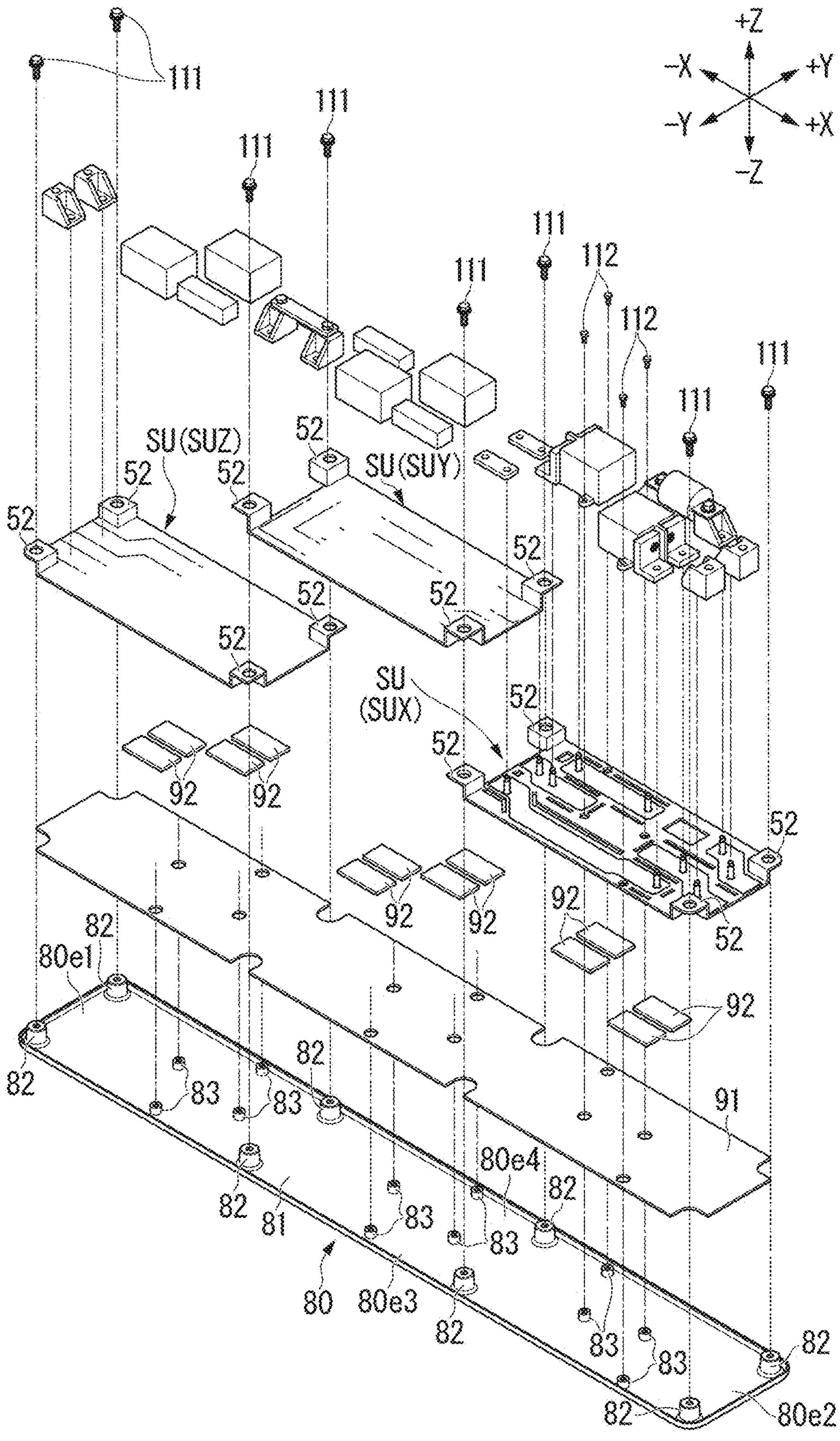
FIG. 11 is a partially exploded perspective view of a connection unit according to the embodiment.

FIG. 11 is a partially exploded perspective view of the electrical connection unit 1. The metal plate 80 is a member for securing rigidity of the electrical connection unit 1 and enhancing a heat dissipation property of the electrical connection unit 1. The metal plate 80 is made of a metal (for example, aluminum or an aluminum alloy). The metal plate 80 may be referred to as a "rigid member".

The metal plate 80 has a rectangular shape formed in the X direction when viewed from the Z direction. The metal plate 80 has a first end 80*e*1, a second end 80*e*2, a third end 80*e*3, and a fourth end 80*e*4. The first end 80*e*1 and the second end 80*e*2 are a pair of ends of the metal plate 80 in the longitudinal direction, and are separated in the X direction. The third end 80*e*3 and the fourth end 80*e*4 are a pair of ends of the metal plate 80 in the lateral direction, and are separated in the Y direction. The metal plate 80 includes, for example, a flat surface portion 81, a plurality of fixing portions 82, and a plurality of fixing portions 83.

The flat surface portion 81 is a portion formed in a plate shape in the metal plate 80. The flat surface portion 81 has a plate shape formed in the horizontal direction. The flat surface portion 81 forms a main portion of the metal plate 80. The flat surface portion 81 forms a base portion (metal base portion) of the metal plate 80. In the present embodiment, the flat surface portion 81 has a size that covers the three subunits SU from below. The flat surface portion 81 faces the routing boards 40 of the three subunits SU. In the present embodiment, the metal plate 80 forms a gap S1 (see FIG. 13) with the second surface 51*b* of the flat surface portion 51 of each subunit SU, and faces the second surface 51*b* of the flat surface portion 51 of each subunit SU. The gap S1 is an example of a "first gap".

The fixing portion 82 is a fixing portion for fixing the base plate 41 of each subunit SU to the metal plate 80. The fixing portion 82 is provided at a position corresponding to the fixing portion 52 of the base plate 41 of each subunit SU when viewed from the Z direction. The fixing portion 82 is a cylindrical or prismatic boss protruding in the +Z direction from the flat surface portion 81 of the metal plate 80.

The fixing portion 83 is a fixing portion for directly fixing the electronic component 10 of each subunit SU to the metal plate 80 without interposing the base plate 41. The fixing portion 83 is provided at a position corresponding to the attachment portion 14 of the electronic component 10 of each subunit SU when viewed from the Z direction. The fixing portion 83 is a cylindrical or prismatic boss protruding in the +Z direction from the flat surface portion 81.

<4.2 Insulating Sheet>

The insulating sheet 91 is an insulating member for electrically insulating the metal plate 80 and the bus bar 42 of each subunit SU. The insulating sheet 91 is made of, for example, a synthetic resin such as polyester or polyimide, and has an insulating property. The insulating sheet 91 has a rectangular shape when viewed from the Z direction. The insulating sheet 91 has a sheet shape formed in the horizontal direction. The insulating sheet 91 is disposed between the flat surface portion 81 of the metal plate 80 and the routing board 40 of each subunit SU. For example, the insulating sheet 91 is disposed between the flat surface portion 81 of the metal plate 80 and the plurality of heat transfer members 92.

In the present embodiment, the insulating sheet 91 is attached to the flat surface portion 81 of the metal plate 80. The insulating sheet 91 has a notch or an opening for avoiding the fixing portion 82 and the fixing portion 83 of the metal plate 80. Note that, instead of the above example, the insulating sheet 91 may be provided between the routing board 40 of each subunit SU and the plurality of heat transfer members 92. Note that, in a case where the heat transfer member 92 has an insulating property and the necessary insulating property is secured by the heat transfer member 92, the insulating sheet 91 may be omitted.

<4.3 Heat Transfer Member>

The heat transfer member 92 is a member for transferring heat generated by the electronic component 10 at the time of energization and/or heat (Joule heat) generated by the bus bar 42 itself at the time of energization to the metal plate 80. The heat transfer member 92 is, for example, a heat transfer sheet (for example, a thermally conductive silicone sheet) having elasticity. The heat transfer member 92 is made of a material having higher thermal conductivity than that of the base plate 41, for example. However, the heat transfer member 92 is not limited to the above example, and may be a heat transfer member made of a thermally conductive gel or another material.

Figure 12:
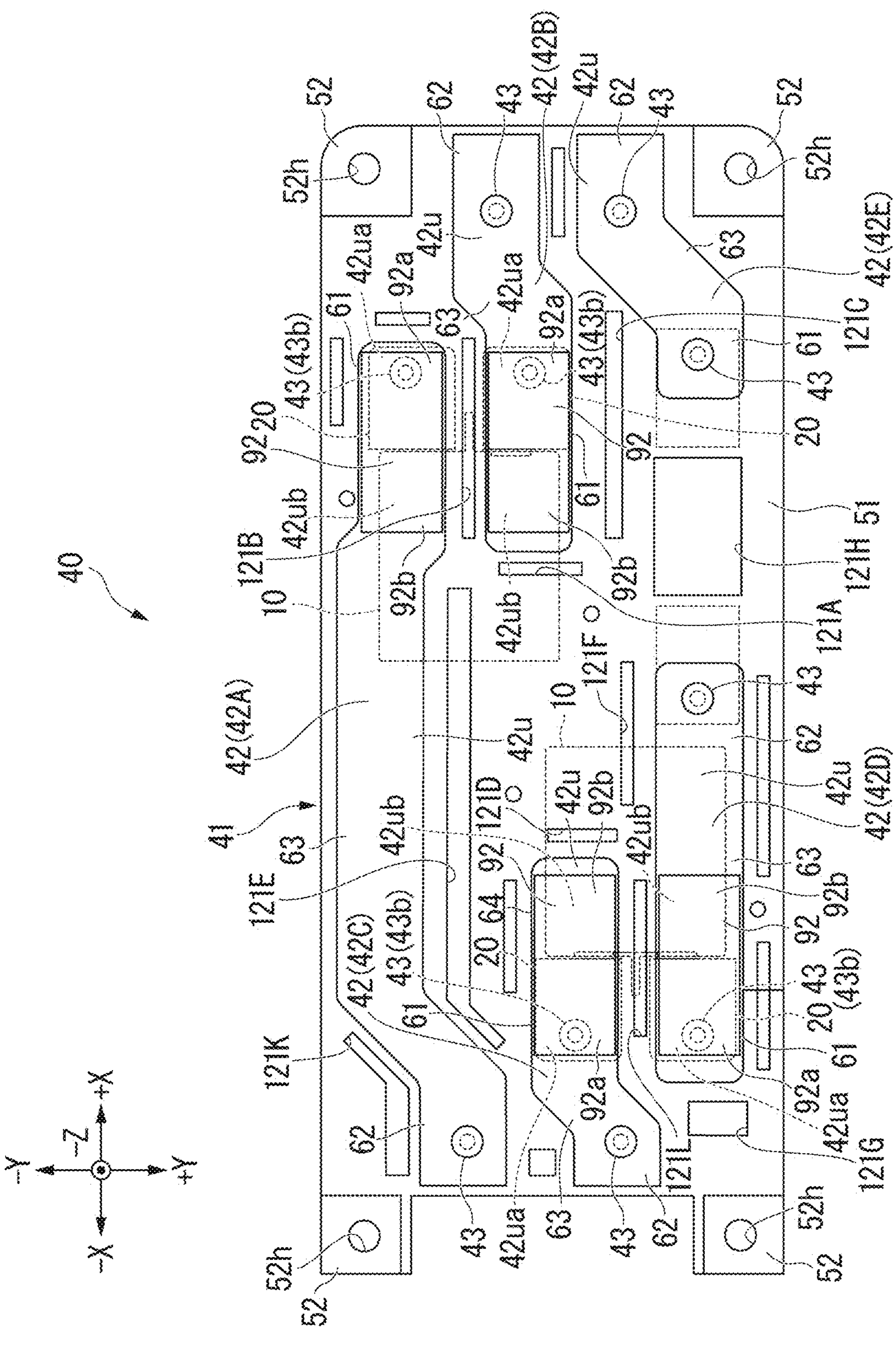
FIG. 12 is a bottom view illustrating the routing board of the embodiment.

FIG. 12 is a bottom view illustrating the routing board 40. In the present embodiment, the plurality of heat transfer members 92 are partially provided in the routing board 40. For example, the plurality of heat transfer members 92 are disposed at positions overlapping a part of the bus bar 42 when viewed from the Z direction. More specifically, the plurality of heat transfer members 92 are disposed at positions overlapping a part of the bus bar 42 in the vicinity of the electronic component 10 (for example, the electronic components 10A and 10B) when viewed from the Z direction. In the present embodiment, the plurality of heat transfer members 92 are disposed at positions overlapping the connection component 20 when viewed from the Z direction.

Figure 13:
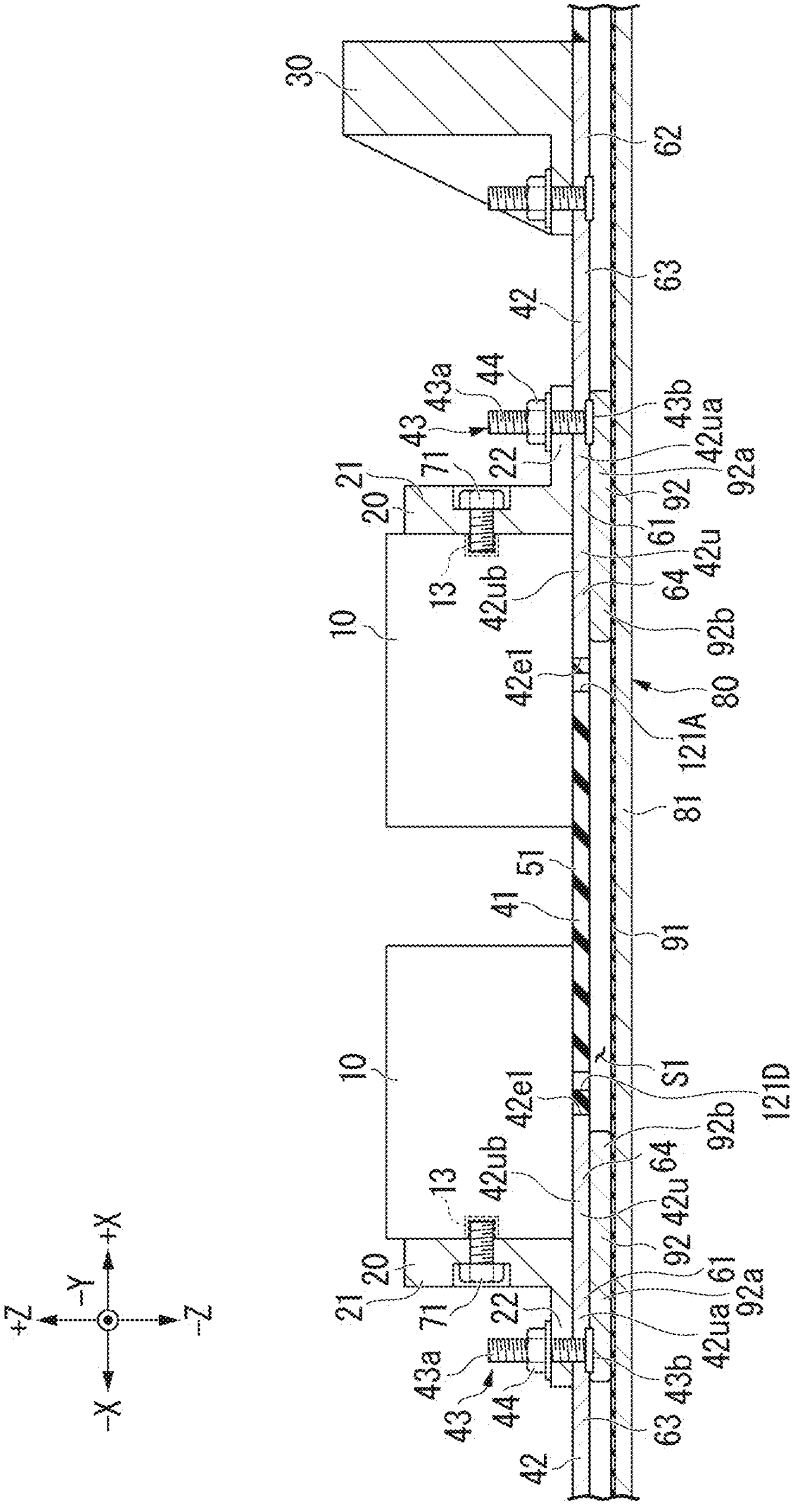
FIG. 13 is a cross-sectional view taken along line F13-F13 of a structure illustrated in FIG. 10.

FIG. 13 is a cross-sectional view taken along line F13-F13 of the structure illustrated in FIG. 10. In the present embodiment, the heat transfer member 92 is disposed between the metal plate 80 and the bus bar 42. The heat transfer member 92 transfers heat transferred from the electronic component 10 to the bus bar 42 and/or heat generated by the bus bar 42 from the bus bar 42 to the metal plate 80.

In the present embodiment, a part of the heat transfer member 92 is in contact with the bus bar 42 at a position overlapping the connection component 20 when viewed from the Z direction. In this case, the heat transfer member 92 easily transfers the heat transferred from the terminal 13 of the electronic component 10 to the connection component 20 from the connection component 20 to the metal plate 80 via the bus bar 42.

In the present embodiment, a part of the heat transfer member 92 is disposed at a position overlapping the head 43*b* of the fastening member 43 when viewed from the Z direction, and is in contact with the head 43*b* of the fastening member 43. In this case, the heat transfer member 92 easily transfers the heat transferred from the terminal 13 of the electronic component 10 to the connection component 20 from the fastening member 43 to the metal plate 80.

In the present embodiment, a part of the heat transfer member 92 is in contact with the bus bar 42 at a position overlapping the electronic component 10 when viewed from the Z direction. In this case, the heat transfer member 92 easily transfers the heat transferred from the electronic component 10 to the bus bar 42 from the bus bar 42 to the metal plate 80. In the example illustrated in FIG. 13, the upper surface of the bus bar 42 is in contact with the electronic component 10, and thus the bus bar 42 is thermally connected to the electronic component 10. Note that the bus bar 42 may be thermally connected to the electronic component 10 at the extending portion 63 or the extension 64.

<4.4 Insulating Cover>

Referring to FIG. 1 again, the insulating cover 93 will be described. The insulating cover 93 is a member for preventing the main body MU from contacting the energization path. The insulating cover 93 is made of, for example, a synthetic resin and has an insulating property. The insulating cover 93 has, for example, a box shape that is open on the −Z direction side. The insulating cover 93 has a plurality of vent holes 93*h*. The insulating cover 93 is attached to the metal plate 80 in the Z direction. Note that the insulating cover 93 is not limited to a box-shaped member, and may be a sheet-shaped member that covers the energization path of the main body MU.

<5. Opening>

The base plate 41 will be described in more detail. As illustrated in FIG. 4, the flat surface portion 51 of the base plate 41 has at least one or more openings 121. In the following description, a representative opening 121 (for example, the openings 121A, 121B, 121C, 121D, 121E, 121F, 121G, 121H, 121K, and 121L) will be described in detail. Although the description will be made by using the subunit SUX as an example, the other subunits SUY and SUZ may have the same opening 121. Note that only one opening 121 may be provided in the electrical connection unit 1.

The opening 121 penetrates the flat surface portion 51 in the first direction (Z direction). As illustrated in FIGS. 4, 10, and 12, the openings 121A, 121B, 121C, 121D, 121E, 121F, 121G, 121H, 121K, and 121L are disposed along a part of the outer shape of the bus bar 42. The opening 121H is disposed along a part of the outer shape of the first electronic component 10. The distance L1 between the opening 121 and the bus bar 42 is smaller than a width 42*w* in the third direction (Y direction) of the straight portion 42*s* included in the bus bar 42.

The openings 121B, 121C, 121F, 121H, and 121L linearly extend in the second direction (X direction) along the above-described straight portion 42*s*. The openings 121A, 121D, and 121G linearly extend in the width direction of the bus bar 42 in the third direction (Y direction). The openings 121E and 121K partially extend along the bus bar 42 in a direction intersecting the second direction and the third direction.

In addition, the openings 121 of the present embodiment include first openings extending along a part of the bus bar 42 and second openings provided away from one opening and extending along another part of the bus bar 42. For example, assuming that the first openings are the openings 121B, 121C, 121F, 121H, and 121L, the second openings correspond to the openings 121A, 121D, 121E, 121G, and 121K. That is, two or more openings 121 are disposed along different portions of the outer shape of one bus bar 42, and are provided separately around the bus bar 42.

Here, the disposition of the opening 121 will be described. When the electrical connection unit 1 is mounted on a vehicle, each electronic component operates during the operation of the vehicle (such as during traveling or charging). The temperature of the electrical connection unit 1 gradually increases due to heat generation of each electronic component during operation and heat generation of the bus bar 42 that supplies power. The linear expansion coefficient of the base plate 41 made of a synthetic resin is larger than the linear expansion coefficient of the metal plate 80 made of a metal. Therefore, at the time of thermal expansion, the base plate 41 tends to extend more than the metal plate 80. On the other hand, at the time of thermal contraction, the base plate 41 tends to contract more than the metal plate 80.

In this case, the deformation amount of the base plate 41 in a predetermined direction due to a temperature change is estimated from the linear expansion coefficient. Assuming that the length of the base plate 41 between the bus bars 42 adjacent to each other in the second direction or the third direction is L2, the deformation amount of the base plate 41 between the bus bars 42 adjacent to each other is as follows from the linear expansion coefficient α. The deformation amount of the base plate 41 between the adjacent bus bars 42 may also be replaced with a deformation amount of the flat surface portion 51 between the adjacent accommodation portions 55.

$$\Delta L=\alpha L2\Delta T$$

ΔL is a deformation amount of the base plate 41 between the bus bars 42 adjacent to each other in a predetermined direction. The deformation amount is the deformation amount in a predetermined direction.

ΔT is an amount of temperature change of the electrical connection unit 1.

As described above, for example, as illustrated in FIG. 9, as L2 in a predetermined direction (for example, the second direction or the third direction) increases, a deformation amount in a part of base plate 41 sandwiched between two bus bars 42 increases.

When the length of the base plate 41 between the side peripheral surface 41CS of the base plate 41 and the bus bar 42 is L3, the deformation amount of the base plate 41 between the side peripheral surface 41CS and the bus bar 42 increases as L3 in a predetermined direction (for example, the second direction or the third direction) increases. That is, as the bus bar 42 is separated from the side peripheral surface 41CS, the deformation amount of the base plate 41 between the side peripheral surface 41CS and the bus bar 42 increases. The side peripheral surface 41CS is directed in a direction intersecting the first direction (Z direction).

For example, as a comparative example, a case where the flat surface portion 51 does not have the opening 121 will be described. When the temperature of the electrical connection unit 1 becomes high, the base plate 41 greatly expands. Assuming that dimensions of the base plate 41 and the bus bar 42 in a predetermined direction are the same, the deformation amount of the bus bar 42 with respect to the temperature rise of the electrical connection unit 1 is smaller than the deformation amount of the base plate 41. Therefore, a part of the base plate 41 may locally expand at a contact portion with the bus bar 42. When the connection unit 1 returns to room temperature, a space is formed between the base plate 41 and the bus bar 42 due to a difference in the value of the linear expansion coefficient. Depending on a size of this space, the bus bar 42 may fall off.

Therefore, the flat surface portion 51 of the present embodiment has the opening 121 disposed along at least one of a part of the outer shape of the bus bar 42 or a part of the outer shape of the first electronic component 10. The distance L1 between the opening 121 and the bus bar 42 is smaller than the width 42*w* of the straight portion 42*s* included in the bus bar 42 in the third direction (Y direction).

For example, in the bus bar 42, an end surface of the bus bar 42 located on the +X direction side is defined as a first end surface, and an end surface of the bus bar 42 located on the −X direction side is defined as a second end surface. Similarly, in the bus bar 42, an end surface of the bus bar 42 located on the +Y direction side is defined as a third end surface, and an end surface of the bus bar 42 located on the −Y direction side is defined as a fourth end surface. In the present embodiment, the first connection portion 61 is located on the first end surface side as viewed from the central portion of the bus bar 42, and the second connection portion 62 is located on the second end surface side as viewed from the central portion of the bus bar 42.

Taking the bus bar 42D as an example, the first opening may be disposed at a predetermined position from one end surface of the bus bar 42D, and the second opening may be disposed at a predetermined position from the other end surface. The flat surface portion 51 has the first opening (for example, the opening 121H) within a range of the width 42*w* from the first end surface of the bus bar 42 (for example, the bus bar 42D), and has the second opening (for example, the opening 121G) within a range of the width 42*w* from the second end surface of the bus bar 42 (for example, the bus bar 42D). In addition, the flat surface portion 51 has a third opening (for example, the opening 121C) within a range of the width 42*w* from the third end surface of bus bar 42 (for example, the bus bar 42B), and has a fourth opening (for example, the opening 121B) within a range of the width 42*w* from the fourth end surface of the bus bar 42 (for example, the bus bar 42B). The third opening is an example of a "first opening", and the fourth opening is an example of a "second opening".

The flat surface portion 51 may have openings 121 respectively corresponding to the first end surface, the second end surface, the third end surface, and the fourth end surface of the bus bar 42 (for example, the bus bar 42D). In this case, at least four openings 121 are each bridged by the flat surface portion 51. In addition, there may be two or more openings 121 corresponding to one end surface. For example, the flat surface portion 51 has the openings 121F and 121L corresponding to the second end surface of the bus bar 42 (for example, the bus bar 42D).

FIG. 13 is a cross-sectional view taken along line F13-F13 of the structure illustrated in FIG. 10.

The electrical connection unit 1 of the present embodiment has a metal plate 80 that is disposed with a gap S1 between the metal plate and the base plate 41 and faces the second surface 51*b* of the flat surface portion 51. The heat transfer member 92 is present between the bus bar 42 and the metal plate 80. In this constitution, heat may be confined in the gap S1 between the base plate 41 and the metal plate 80.

In the present embodiment, the opening 121 also has a function as a heat dissipation opening. The opening 121 penetrates the flat surface portion 51 in the Z direction, communicates with the gap S1 between the flat surface portion 51 and the metal plate 80, and allows air to pass therethrough. The air in the gap S1 between the flat surface portion 51 and the metal plate 80 is moved above the flat surface portion 51 through the opening 121, for example, in response to being warmed.

According to such a constitution, heat is less likely to be confined in the gap S1 between the base plate 41 and the metal plate 80. In a case where heat is hardly confined in gap S1, the heat dissipation property of the bus bar 42 is improved. When the heat dissipation property of the bus bar 42 is improved, the heat dissipation property of the electrical connection unit 1 can be improved.

As illustrated in FIGS. 10 and 12, at least a part of the opening 121 is disposed at a position overlapping the first electronic component 10 when viewed from the first direction. For example, the opening 121H matches the above content.

Figure 14:
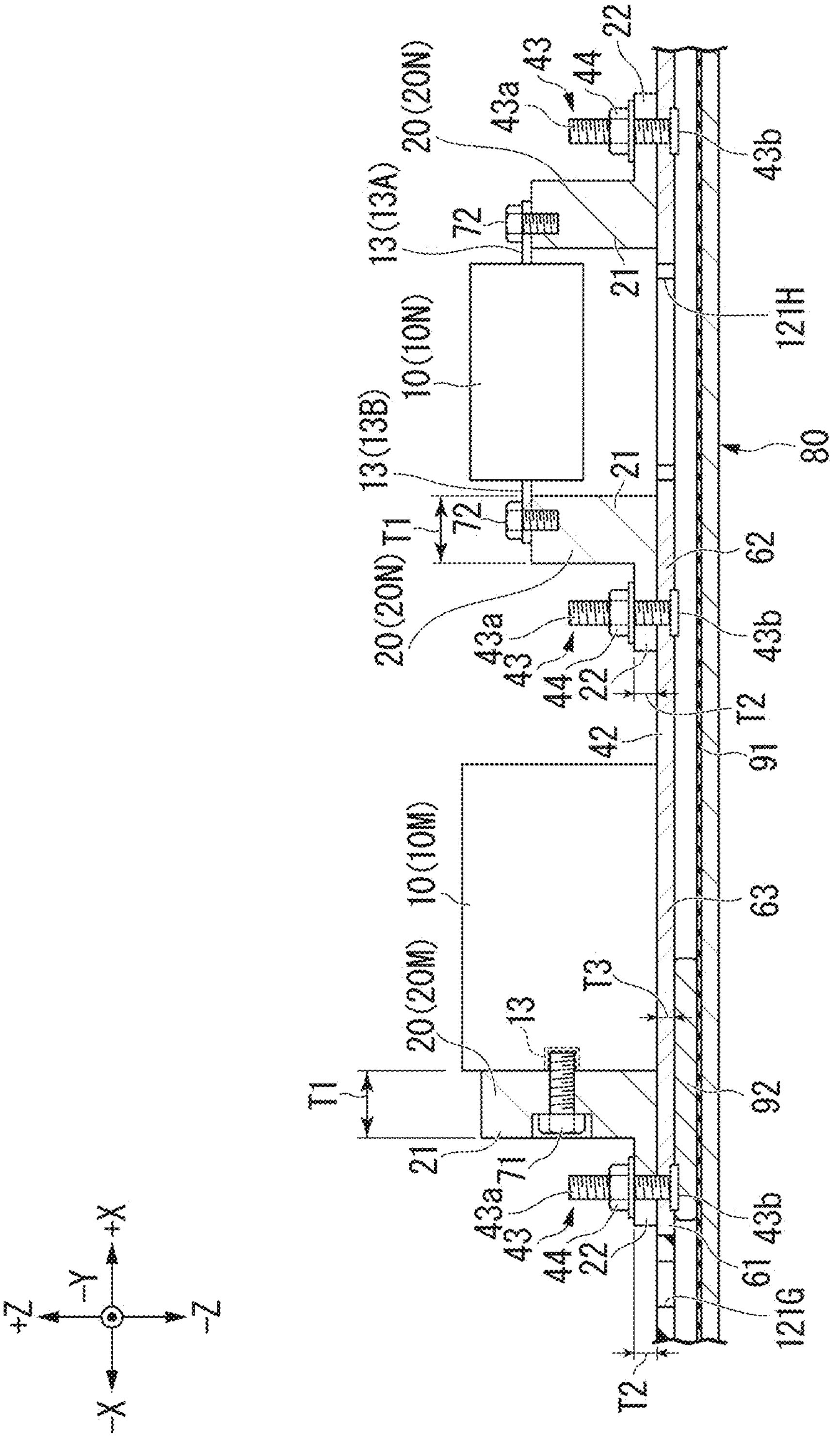
FIG. 14 is a cross-sectional view taken along line F14-F14 of the structure illustrated in FIG. 10.

FIG. 14 is a cross-sectional view taken along line F14-F14 of the structure illustrated in FIG. 10. The opening 121H will be described in detail. When the electronic component 10 is fixed across the two connection components 20, two bus bars 42 (for example, the bus bars 42D and 42E) each receive heat from the electronic component 10 via the two connection components 20. In this case, thermal expansion of the base plate 41 between the two connection components 20 becomes extremely large, and the electronic component 10 is repeatedly loaded while thermal expansion and thermal contraction are repeated. In a case where the electronic component 10 is a fuse, a load acts on a fuse portion inside the fuse, and the life of the electronic component 10 may be shortened.

Therefore, in the present embodiment, at least a part of the opening 121 is disposed at a position overlapping the first electronic component 10 when viewed from the first direction (Z direction).

<14. Advantages>

As a comparative example, an electrical connection unit in which a bus bar is disposed in a standing posture with respect to a lower wall of a housing will be considered. In such a constitution of the comparative example, for example, since a cross-sectional area of a bus bar is determined in order to function as a routing member, it may be difficult to reduce a width (height) of the standing bus bar. In this case, the width of the standing bus bar becomes a bottleneck, and it may be difficult to reduce a height of the electrical connection unit.

On the other hand, in the present embodiment, the electrical connection unit 1 includes the first electronic component 10 and the routing board 40. The routing board 40 includes a base member 41 and a first bus bar 42. The base member 41 has a plate-shaped or sheet-shaped flat surface portion 51 having a first surface 51*a* facing the first electronic component 10. The flat surface portion 51 has the first accommodation portion 55 recessed in the Z direction or penetrating the flat surface portion 51 in the Z direction. At least a part of the first bus bar 42 is accommodated in the first accommodation portion 55 and extends along the flat surface portion 51. According to such a constitution, compared with the structure of the comparative example in which at least a part of the routing path is formed on a plane, the width of the bus bar is less likely to be a bottleneck, and the height of the electrical connection unit 1 can be easily reduced.

In the present embodiment, attention is also paid to a difference in linear expansion coefficient between the base plate 41 and the metal plate 80. For example, as a comparative example, a case where the flat surface portion 51 does not have the opening 121 will be described. When the temperature of the electrical connection unit 1 becomes high, the base plate 41 greatly expands. Assuming that dimensions of the base plate 41 and the bus bar 42 in a predetermined direction are the same, the deformation amount of the bus bar 42 with respect to the temperature rise of the electrical connection unit 1 is smaller than the deformation amount of the base plate 41. Therefore, a part of the base plate 41 may locally expand at a contact portion with the bus bar 42. When the connection unit 1 returns to room temperature, a space is formed between the base plate 41 and the bus bar 42 due to a difference in the value of the linear expansion coefficient. Depending on a size of this space, the bus bar 42 may fall off.

In the present embodiment, the flat surface portion 51 has an opening 121 disposed along at least one of a part of the outer shape of the bus bar 42 or a part of the outer shape of the first electronic component 10. As a result, the opening

121 absorbs the expansion of the base plate 41, and the local expansion of the base plate 41 is less likely to occur around the bus bars 42. In this case, if the distance L1 between the opening 121 and the bus bar 42 is smaller than the width 42*w* of the straight portion 42*s* included in the bus bar 42 in the third direction (Y direction), the above local expansion is less likely to occur around the bus bar 42.

In the present embodiment, at least a part of the bus bar 42 is held by the flat surface portion 51. Since the above local expansion is less likely to occur around the bus bar 42, the bus bar 42 is easily held by the flat surface portion 51.

In the present embodiment, the openings 121B, 121C, 121F, 121H, and 121L linearly extend in the second direction (X direction) along the above straight portion 42*s*. According to such a constitution, thermal expansion of the base plate 41 that may occur in the second direction (X direction) in which the bus bars 42 extend is curbed.

In the present embodiment, the openings 121 include a first opening extending along a part of the bus bar 42 and a second opening provided away from the first opening and extending along another part of the bus bar 42. According to such a constitution, the above local expansion is less likely to occur in the first opening and the second opening. Since there are two openings 121 along the outer shape of the bus bar 42, a part of the bus bar 42 is easily held by the flat surface portion 51.

In the present embodiment, at least a part of the opening 121 is disposed at a position overlapping the first electronic component 10 when viewed from the first direction (Z direction). According to such a constitution, thermal expansion of the base plate 41 is curbed around the position overlapping the first electronic component 10. When the thermal expansion of the base plate 41 is curbed, in a case where the electronic component 10 is a fuse, a large load is less likely to act on a fused portion inside the fuse, and the life of the electronic component 10 can be extended.

In the present embodiment, the flat surface portion 51 has a first opening and a second opening, the flat surface portion 51 has the first opening within a range of the width 42*w* from the first end surface (third end surface) of the first bus bar, and the flat surface portion 51 has the second opening within a range of the width 42*w* from the second end surface (fourth end surface) of the first bus bar. According to such a constitution, the above local expansion is less likely to occur at both end surfaces (the first end surface and the second end surface) of the bus bar 42 in a predetermined direction (for example, the second direction or the third direction). Two end surfaces at both ends of the bus bar 42 face each other, and accordingly, the two openings 121 also face each other, so that both ends of the bus bar 42 are easily held by the flat surface portion 51.

The present embodiment further includes a second bus bar including a second connection portion (the first connection portion 61 or the second connection portion 62), in which the first bus bar includes a first connection portion (the first connection portion 61 or the second connection portion 62) for electrical connection to the first electronic component 10, the first external device, or another bus bar, and the flat surface portion 51 has the openings 121 (the openings 121B, 121H, and 121L) between the first connection portion 61 and the second connection portion 62. According to such a constitution, thermal expansion of the base plate 41 is curbed around the position where the opening 121 is provided.

MODIFICATION EXAMPLES

Next, several modification examples will be described. Note that a constitution other than that described below in each modification example is the same as the constitution of the first embodiment.

First Modification Example

The routing board 40 is not limited to a structure in which the base plate 41 and the bus bar 42 are integrated through insert molding. For example, the bus bar 42 may be disposed in the accommodation portion 55 after the base plate 41 provided with the accommodation portion 55 for accommodating the bus bar 42 is molded. In this case, the bus bar 42 may be fixed to the accommodation portion 55 through fitting, or may be fixed to the accommodation portion 55 via an adhesive or other fixing means. In these cases, potting may be performed to fill a gap between the bus bar 42 and the accommodation portion 55.

Second Modification Example

A base member of the routing board 40 is not limited to the base plate 41 having the plate-shaped flat surface portion 51. The routing board 40 may be a base member (for example, an insulating sheet) having a sheet-shaped flat surface portion 51. In this case, the accommodation portion 55 may be formed by a part of the flat surface portion 51 following the outer shape of the bus bar 42. In the present disclosure, the "sheet-shaped" or "sheet" is not limited to a member having a thickness of 1 mm or more, and a member (so-called a film) having a thickness of less than 1 mm can also be used.

Third Modification Example

A connection between the electronic component 10 and the bus bar 42 is not limited to the connection using the connection component 20. The electronic component 10 may be directly connected to the bus bar 42 by using a fastening member (for example, a bolt or a screw), welding, or the like. For example, it is conceivable that the terminal 13 of the electronic component 10 and the bus bar 42 are brought into direct contact with each other through welding or the like.

Several embodiments and modification examples have been described above. However, the embodiment and the modification examples are not limited to the examples described above. For example, a plurality of embodiments may be implemented in combination with each other. The above-described embodiments can be implemented in various other forms, and various additions, omissions, substitutions, and changes can be made without departing from the concept of the present disclosure.

According to the present disclosure, the height of the electrical connection unit can be reduced.

REFERENCE SIGNS LIST

1 Electrical connection unit
SU Subunit
10 Electronic component
13, 13A, 13B Terminal
20 Connection component
21 First portion
21*h* First attachment hole

22 Second portion
22*h* Second attachment hole
30 Connection component
31 First portion
32 Second portion
40 Routing board
41 Base plate
41CS Side peripheral surface
42 Bus bar
42*e*1 End of bus bar
42*p* Plate portion
42*s* Straight portion
42*u* Exposed portion
42*ua* First portion
42*ub* Second portion
42*w* Width
43 Fastening member (fastening portion)
51 Flat surface portion (insulating base portion)
51*a* First surface, third surface
51*b* Second surface, fourth surface
52 Fixing portion
528 First portion, third portion
52*b* Second portion, fourth portion
55 Accommodation portion
56 Engagement portion
56*a* Recess
61 First connection portion
62 Second connection portion
63 Extending portion
64 Extension
71 Fastening member
72 Fastening member
73 Fastening member
80 Metal plate
81 Flat surface portion (metal base portion)
82 Fixing portion
83 Fixing portion
92 Heat transfer member
92 First heat transfer portion
92*b* Second heat transfer portion
100 Connection component
111 Fastening member
112 Fastening member
121 Opening
131, 132 Holding portion
141 Support portion
L1 Distance between opening 121 and bus bar 42
L2 Length of base plate 41 between bus bars 42 adjacent in predetermined direction
L3 Length of base plate 41 between side peripheral surface 41CS and bus bar 42

What is claimed is:

1. An electrical connection unit comprising:

a first electronic component;

an insulating base member that includes a flat surface portion having a plate shape or a sheet shape, the flat surface portion including an accommodation portion that is recessed in a first direction or penetrates the flat surface portion in the first direction in a case where a thickness direction of the flat surface portion is the first direction; and a first bus bar that is at least partially accommodated in the accommodation portion, extends along the flat surface portion, and is electrically connected to the first electronic component, wherein the flat surface portion has an opening that penetrates the flat surface portion in the first direction and that is disposed along at least one of a part of an outer shape of the first bus bar and a part of an outer shape of the first electronic component.

2. The electrical connection unit according to claim 1, wherein in a case where a direction intersecting the first direction is a second direction, and a direction intersecting the first direction and the second direction is a third direction, the first bus bar includes a straight portion extending in the second direction, and a distance between the opening and the first bus bar is smaller than a width of the straight portion in the third direction.

3. The electrical connection unit according to claim 2, wherein the opening extends linearly in the second direction along the straight portion.

4. The electrical connection unit according to claim 1, wherein the opening has a first opening extending along a part of the first bus bar and a second opening provided away from the first opening and extending along another part of the first bus bar.

5. The electrical connection unit according to claim 1, wherein at least a part of the opening is disposed at a position overlapping the first electronic component when viewed from the first direction.

* * * * *